United States Patent
Ji et al.

(10) Patent No.: US 12,342,262 B2
(45) Date of Patent: Jun. 24, 2025

(54) METHOD AND DEVICE FOR TRANSMITTING/RECEIVING DATA, FOR NETWORK COOPERATIVE COMMUNICATION

(71) Applicant: Samsung Electronics Co., Ltd., Suwon-si (KR)

(72) Inventors: Hyoungju Ji, Suwon-si (KR); Hoondong Noh, Suwon-si (KR); Jinhyun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 310 days.

(21) Appl. No.: 17/763,478

(22) PCT Filed: Sep. 28, 2020

(86) PCT No.: PCT/KR2020/013219
§ 371 (c)(1),
(2) Date: Mar. 24, 2022

(87) PCT Pub. No.: WO2021/060954
PCT Pub. Date: Apr. 1, 2021

(65) Prior Publication Data
US 2023/0232313 A1 Jul. 20, 2023

(30) Foreign Application Priority Data
Sep. 27, 2019 (KR) .......................... 10-2019-0119843

(51) Int. Cl.
*H04W 72/23* (2023.01)
*H04L 5/00* (2006.01)
(Continued)

(52) U.S. Cl.
CPC ........... *H04W 48/10* (2013.01); *H04L 5/0051* (2013.01); *H04L 5/0094* (2013.01); *H04W 72/04* (2013.01)

(58) Field of Classification Search
CPC .... H04W 48/10; H04W 72/04; H04L 5/0051; H04L 5/0094
See application file for complete search history.

(56) References Cited

U.S. PATENT DOCUMENTS 9,831,932 B2    11/2017  Kang et al.
10,194,410 B2 *  1/2019  Ly .......................... H04L 5/0051
(Continued)

FOREIGN PATENT DOCUMENTS

CN    109391426 A    2/2019
CN    110034872 A    7/2019
(Continued)

OTHER PUBLICATIONS

Extended European Search Report dated Sep. 28, 2022, issued in European Patent Application No. 20868413.4.
(Continued)

*Primary Examiner* — Kenny S Lin
(74) *Attorney, Agent, or Firm* — Jefferson IP Law, LLP

(57) ABSTRACT

The present disclosure relates to a communication technique for converging IoT technology with a 5G communication system for supporting a higher data transmission rate beyond a 4G system, and a system therefor. The present disclosure may be applied to an intelligent service (for example, a smart home, a smart building, a smart city, a smart car or connected car, health care, digital education, retail business, a security and safety-related service, etc.) on the basis of 5G communication technology and IoT-related technology. In addition, the present disclosure relates to a method and device for carrying out cooperative communication in a
(Continued)

wireless communication system. A method of a terminal of a communication system, according to one embodiment of the present disclosure, comprises the steps of: receiving, from a base station associated with a first cell, cell configuration information including a TCI configuration and a QCL configuration; checking a QCL reference antenna port on the basis of the cell configuration information; and receiving a signal from the base station on the basis of a QCL relationship with the checked QCL reference antenna port, wherein the QCL reference antenna port may be checked on the basis of a CSI-RS or SSB associated with a second cell.

15 Claims, 19 Drawing Sheets

(51) Int. Cl.
*H04W 48/10* (2009.01)
*H04W 72/04* (2023.01)

(56) References Cited

U.S. PATENT DOCUMENTS

| | | | |
|---|---|---|---|
| 11,271,699 B1* | 3/2022 | Eyuboglu | H04L 25/0226 |
| 11,617,173 B2 | 3/2023 | Miao et al. | |
| 2015/0092768 A1 | 4/2015 | Ng et al. | |
| 2015/0358848 A1 | 12/2015 | Kim et al. | |
| 2015/0365154 A1 | 12/2015 | Davydov et al. | |
| 2019/0222286 A1* | 7/2019 | Miao | H04L 5/0048 |
| 2019/0261244 A1* | 8/2019 | Jung | H04L 5/0053 |
| 2020/0077395 A1 | 3/2020 | Guo | |
| 2020/0245166 A1 | 7/2020 | Kwak et al. | |
| 2021/0014808 A1* | 1/2021 | Takahashi | H04J 11/0076 |
| 2021/0120481 A1* | 4/2021 | Cheng | H04W 24/02 |
| 2021/0185652 A1* | 6/2021 | Rune | H04W 72/0446 |
| 2021/0258062 A1* | 8/2021 | Koskela | H04W 16/28 |
| 2022/0263558 A1* | 8/2022 | Zhu | H04L 5/0051 |

FOREIGN PATENT DOCUMENTS

| | | | | |
|---|---|---|---|---|
| EP | 4152885 A1 * | 3/2023 | | H04B 17/309 |
| KR | 10-2016-0010443 A | 1/2016 | | |
| KR | 10-2019-0043069 A | 4/2019 | | |
| WO | 2018/217063 A1 | 11/2018 | | |

OTHER PUBLICATIONS

Qualcomm Inc., Multi-TRP Enhancements, 3GPP TSG-RAN WG1 Meeting AH-1901, R1-1900905, Taipei, Taiwan, Jan. 12, 2019.
CATT, NR mobility and RS design, 3GPP TSG RAN WG1#88bis, R1-1704543, Spokane, USA, Mar. 25, 2017.
3GPP TS 38.133 V15.6.0, 3rd Generation Partnership Project, Technical Specification Group Radio Access Network, NR, User Equipment (UE) procedures in Idle mode and RRC, Inactive state, (Release 15), Jul. 4, 2019.
Korean Office Action dated Oct. 1, 2023, issued in Korean Patent Application No. 10 2019 0119843.
Qualcomm Incorporated, Multi-TRP Enhancements, R1-1911126, 3GPP TSG-RAN WG1 Meeting #98bis, Chongqing, China, Oct. 5, 2019.
Extended European Search Report dated Jun. 14, 2023, issued in European Patent Application No. 23153664.0.
ZTE, Considerations on DL reference signals and channels design for NR-U, R1-1812433, 3GPP TSG RAN WG1 Meeting #95, Nov. 3, 2018, Spokane, USA.
Chinese Office Action dated Aug. 27, 2024, issued in Chinese Application No. 202080067994.2.
European Office Action dated Apr. 16, 2025, issued in European Application No. 23 153 664.0.

* cited by examiner

FIG. 13

| R | Serving Cell ID | | | | | BWP ID | | Oct 1 |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |

...

| $T_{(N-2)\times 8+7}$ | $T_{(N-2)\times 8+6}$ | $T_{(N-2)\times 8+5}$ | $T_{(N-2)\times 8+4}$ | $T_{(N-2)\times 8+3}$ | $T_{(N-2)\times 8+2}$ | $T_{(N-2)\times 8+1}$ | $T_{(N-2)\times 8}$ | Oct N |

METHOD AND DEVICE FOR TRANSMITTING/RECEIVING DATA, FOR NETWORK COOPERATIVE COMMUNICATION

TECHNICAL FIELD

The disclosure relates to a method and a device for performing communication in a wireless communication system and, more particularly, to a method and a device for performing cooperative communication.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" communication system or a "Post LTE" system. The 5G communication system is considered to be implemented in higher frequency (mmWave) bands (e.g., 60 GHz bands) so as to accomplish higher data rates. To decrease propagation loss of the radio waves and increase the transmission distance, beamforming, massive multiple-input multiple-output (MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

With the advance of wireless communication systems as described above, there is a need for data transmission/reception approaches for network cooperation communication.

DISCLOSURE OF INVENTION

Technical Problem

Based on the foregoing discussion, the disclosure provides a method and a device for transmitting and receiving a signal between a transmission node and a UE to perform cooperative communication in a wireless communication system.

Solution to Problem

A method of a UE in a communication system according to an embodiment of the disclosure may include: receiving cell configuration information including a transmission configuration indicator (TCI) configuration and a quasi co-location (QCL) configuration from a base station associated with a first cell; identifying a QCL reference antenna port, based on the cell configuration information; and receiving a signal from the base station, based on a QCL relationship with the identified QCL reference antenna port, wherein the QCL reference antenna port may be identified based on a synchronization signal block (SSB) or a channel state information reference signal (CSI-RS) associated with a second cell.

According to an embodiment, the first cell and the second cell may correspond to different physical cell identities (PCIs).

According to an embodiment, the TCI configuration or the QCL configuration may include information about a physical cell identity (PCI) corresponding to the second cell, and the QCL reference antenna port may be identified based on the SSB associated with the PCI corresponding to the second cell.

According to an embodiment, the TCI configuration or the QCL configuration may include information about a CSI-RS index associated with the second cell included in a CSI-RS configuration for mobility, and the QCL reference antenna port may be identified based on the CSI-RS corresponding to the CSI-RS index associated with the second cell.

According to an embodiment, the signal received from the base station may include at least one of a reference signal, data, and a control signal, and the reference signal may include a tracking reference signal (TRS).

According to an embodiment, the QCL reference antenna port may be identified based on the SSB or the CSI-RS associated with the second cell according to whether the UE performs an inter-cell multi-TRP operation.

According to an embodiment, whether the UE performs the inter-cell multi-TRP operation may be identified based on a capability report of the UE or an SSB configuration received from the base station.

According to an embodiment, the SSB or the CSI-RS associated with the second cell may be related to a reference signal for channel state measurement.

According to an embodiment, the SSB or the CSI-RS associated with the second cell may be related to a beam failure detection (BFD) reference signal or a candidate beam detection (CBD) reference signal.

A method of a base station in a communication system according to an embodiment of the disclosure may include: transmitting cell configuration information including a transmission configuration indicator (TCI) configuration and a quasi co-location (QCL) configuration to a UE; and transmitting a signal to the UE, based on a QCL relationship with a QCL reference antenna port identified based on the cell configuration information, wherein the QCL reference antenna port may be identified based on a synchronization signal block (SSB) or a channel state information reference signal (CSI-RS) associated with a second cell.

A UE in a wireless communication system according to an embodiment of the disclosure may include: a transceiver; and a controller configured to receive cell configuration information including a transmission configuration indicator (TCI) configuration and a quasi co-location (QCL) configuration from a base station associated with a first cell, to identify a QCL reference antenna port, based on the cell configuration information, and to receive a signal from the base station, based on a QCL relationship with the identified QCL reference antenna port, wherein the QCL reference antenna port may be identified based on a synchronization signal block (SSB) or a channel state information reference signal (CSI-RS) associated with a second cell.

A base station in a communication system according to an embodiment of the disclosure may include: a transceiver; and a controller configured to transmit cell configuration information including a transmission configuration indicator (TCI) configuration and a quasi co-location (QCL) configuration to a UE, and to transmit a signal to the UE, based on a QCL relationship with a QCL reference antenna port identified based on the cell configuration information, wherein the QCL reference antenna port may be identified based on a synchronization signal block (SSB) or a channel state information reference signal (CSI-RS) associated with a second cell.

Advantageous Effects of Invention

According to the disclosure, when network cooperative communication is used in a wireless communication system, a UE can improve the reliability of transmitted or received data/control signal by repeated transmissions between transmission points, or can increase the transmission capacity of transmitted or received data/control signal through individual (independent) transmission for each transmission point.

BRIEF DESCRIPTION OF DRAWINGS

FIG. 13 illustrates the structure of a MAC CE message for indicating a TCI state according to an embodiment of the disclosure;

MODE FOR THE INVENTION

Figure 1:
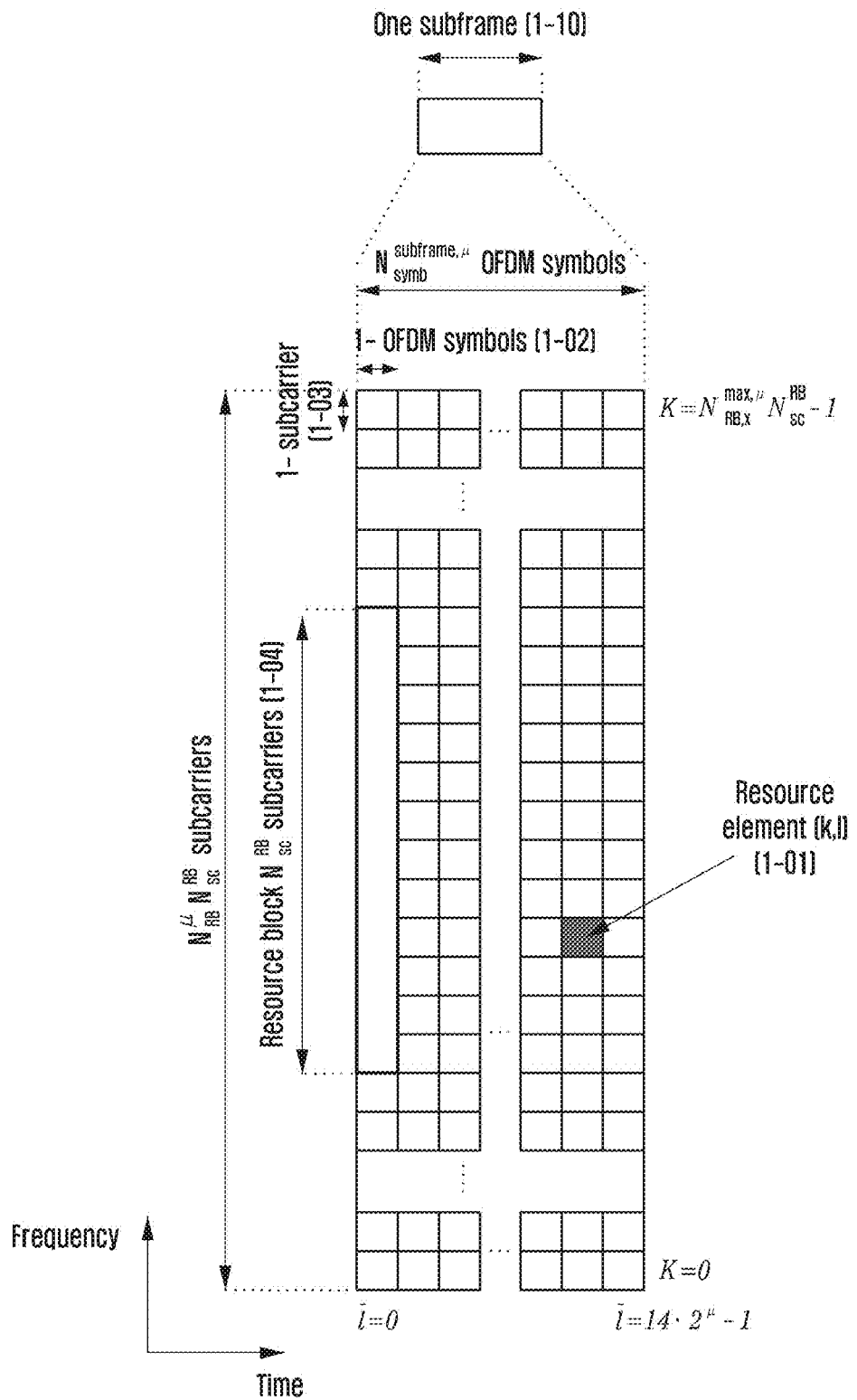
FIG. 1 illustrates the basic structure of a time-frequency domain, which is a radio resource region in which data or a control channel is transmitted in a 5G system according to an embodiment of the disclosure.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Hereinafter, embodiments of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification. In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Of course, examples of the base station and the terminal are not limited thereto. The following description of the disclosure is directed to technology for receiving, by a terminal, broadcast information from a base station in a wireless communication system. The disclosure relates to a communication technique for converging IoT technology with a 5G (5th generation) communication system designed to support a higher data transfer rate beyond the 4G (4th generation) system, and a system therefor. The disclosure may be applied to intelligent services (e.g., smart homes, smart buildings, smart cities, smart cars or connected cars, healthcare, digital education, retail business, security and safety-related services, etc.) on the basis of 5G communication technology and IoT-related technology.

In the following description, terms referring to broadcast information, terms referring to control information, terms related to communication coverage, terms referring to state changes (e.g., event), terms referring to network entities, terms referring to messages, terms referring to device elements, and the like are illustratively used for the sake of convenience. Therefore, the disclosure is not limited by the terms as used below, and other terms referring to subjects having equivalent technical meanings may be used.

In the following description, terms and names defined in the 3rd generation partnership project long term evolution (3GPP LTE) standards may be used for the convenience of description. However, the disclosure is not limited by these terms and names, and may be applied in the same way to systems that conform other standards.

A wireless communication system is evolving from initially providing voice-oriented services into a broadband wireless communication system for providing high-speed and high-quality packet data services according to a communication standard, for example, high speed packet access (HSPA), long-term evolution (LTE or evolved universal terrestrial radio access (E-UTRA)), LTE-advanced (LTE-A), or LTE-Pro of the 3GPP, high rate packet data (HRPD) or ultra-mobile broadband (UMB) of the 3GPP2, and IEEE 802.16e.

As a representative example of a broadband wireless communication system, an LTE system employs an orthogonal frequency division multiplexing (OFDM) scheme for a downlink (DL) and employs a single-carrier frequency division multiple access (SC-FDMA) scheme for an uplink (UL). The uplink refers to a radio link for a user equipment (UE) or a mobile station (MS) to transmit data or a control signal to an eNode B or a base station (BS), and the downlink refers to a radio link for the eNode B to transmit data or a control signal to the UE. These multiple access schemes allocate and manage time-frequency resources for carrying data or control information per user not to overlap with each other, that is, to be orthogonal to each other, thereby dividing data or control information for each user.

A post-LTE communication system, that is, a 5G communication system needs to be able to freely reflect various demands from users and service providers and is thus required to support services satisfying various requirements. Services considered for a 5G communication system include enhanced mobile broadband (eMBB), massive machine-type communication (mMTC), ultra-reliable low-latency communication (URLLC) communications (URLLC), and the like.

According to some embodiments, eMBB is intended to provide a further enhanced data rate than that supported by existing LTE, LTE-A, or LTE-Pro. For example, in a 5G communication system, for one base station, eMBB needs to be able to provide a peak data rate of 20 Gbps in a downlink and a peak data rate of 10 Gbps in an uplink. Further, eMBB needs to provide an increased user-perceived data rate. In order to meet these requirements, improved transmission and reception technologies including an enhanced multiple-input and multiple-output (MIMO) transmission technology are required. In addition, it is possible to satisfy a data rate required for a 5G communication system by employing a frequency bandwidth wider than 20 MHz in a frequency band ranging from 3 to 6 GHz or a 6-GHz frequency band or higher instead of a 2-GHz band currently used for LTE.

In a 5G communication system, mMTC is taken into consideration to support application services, such as the Internet of Things (IoT). To efficiently provide the IoT, mMTC may require support for access of a great number of UEs in a cell, enhanced UE coverage, increased battery time, reduced UE cost, and the like. The IoT is attached to various sensors and various devices to provide a communication function and thus needs to be able to support a large number of UEs (e.g., 1,000,000 UEs/km²) in a cell. A UE supporting mMTC is highly likely to be located in a shadow area not covered by a cell, such as the basement of a building, due to the nature of services and may thus require wider coverage than for other services provided by the 5G communication system. A UE supporting mMTC needs to be configured as a low-cost UE, and may require a very long battery life time because it is difficult to frequently change the battery of the UE.

Finally, URLLC is a mission-critical cellular-based wireless communication service, which is used for remote control of robots or machinery, industrial automation, unmanned aerial vehicles, remote health care, emergency alerts, and the like and needs to provide ultralow-latency and ultra-reliable communication. For example, a URLLC-supporting service is required not only to satisfy an air interface latency of less than 0.5 milliseconds but also to have a packet error rate of 10-5 or less. Therefore, for the URLLC-supporting service, a 5G system needs to provide a shorter transmission time interval (TTI) than that of other services and also requires a design for allocating a wide resource in a frequency band. The foregoing mMTC, URLLC, and eMBB are merely examples of different service types, and service types to which the disclosure is applied are not limited to the foregoing examples.

The foregoing services considered in a 5G communication system need to be provided in a fusion with each other on the basis of one framework. That is, for efficient resource management and control, it is preferable that the services are controlled and transmitted as one integrated system rather than being operated independently.

Hereinafter, although embodiments will be described with reference to an LTE, LTE-A, LTE Pro, or NR system as an example, these embodiments may also be applied to other communication systems having a similar technical background or channel form. Further, the embodiments may also be applied to other communication systems through some modifications without departing from the scope of the disclosure as determined by those skilled in the art.

The disclosure relates to a method and a device for transmitting data and a control signal between a plurality of transmission nodes and a UE performing cooperative communication to improve communication reliability.

According to the disclosure, when network cooperative communication is used in a wireless communication system, a UE can improve the reliability of transmitted or received data/control signal by repeated transmissions between transmission points, or can increase the transmission capacity of transmitted or received data/control signal through individual (independent) transmission for each transmission point.

Hereinafter, a frame structure of a 5G system will be described in detail with reference to accompanying drawings.

FIG. 1 shows a transmission structure in a time-frequency domain in an LTE system, an LTE-A system, an NR system, or similar wireless communication system.

FIG. 1 illustrates the basic structure of the time-frequency domain, which is a radio resource region in which data or a control channel is transmitted in a 5G system.

In FIG. 1, the horizontal axis denotes a time domain, and the vertical axis denotes a frequency domain. The basic unit of a resource in the time-frequency domain is a resource element (RE) 1-01, which may be defined by one orthogonal frequency division multiplexing (OFDM) symbol 1-02 on the time axis and one subcarrier 1-03 on the frequency axis. In the frequency domain, $N_{SC}^{RB}$ (e.g., 12) consecutive REs may form one resource block (RB) 1-04.

Figure 2:
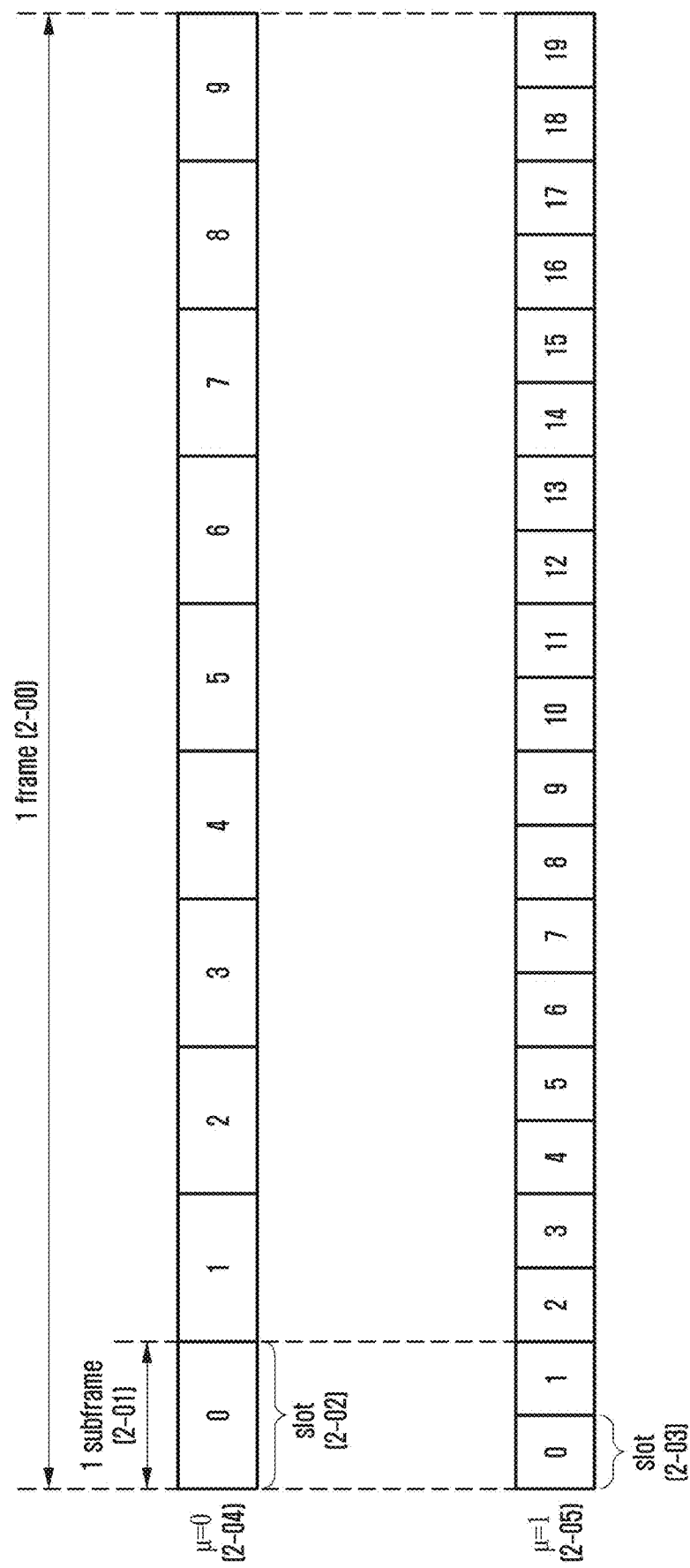
FIG. 2 illustrates the structures of a frame, a subframe, and a slot in a 5G system according to an embodiment of the disclosure.

FIG. 2 illustrates the structures of a frame, a subframe, and a slot in a 5G system.

FIG. 2 illustrates one example of structures of a frame 2-00, a subframe 2-01, and a slot 2-02. One frame 2-00 may be defined as 10 ms. One subframe 2-01 may be defined as 1 ms. Therefore, one frame 2-00 may include a total of ten subframes 2-01. One slot 2-02 and 2-03 may be defined as 14 OFDM symbols (i.e., the number of symbols per slot $(N_{symb}^{slot})=14$). One subframe 2-01 may include one or a plurality of slots 2-02 and 2-03, and the number of slots 2-02 and 2 03 per subframe 2-01 may vary depending on a set subcarrier spacing value μ 2-04 and 2-05.

In the example of FIG. 2, as the set subcarrier spacing value, μ=0 (2-04) and μ=1(2-05). When μ=0 (2-04), one subframe 2-01 may include one slot 2-02; when μ=1 (2-05), one subframe 2-01 may include two slots 2-03. That is, the number of slots per subframe ($N_{slot}^{subframe,\mu}$) may vary depending on the set subcarrier spacing value μ, and the number of slots per frame ($N_{slot}^{frame, \mu}$) may vary accordingly. $N_{slot}^{subframe,\mu}$ and $N_{slot}^{frame,\mu}$ slot according to each subcarrier spacing setting μ may be defined as in Table 1.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |

TABLE 1-continued

| μ | $N_{symb}^{slot}$ | $N_{slot}^{frame, \mu}$ | $N_{slot}^{subframe, \mu}$ |
|---|---|---|---|
| 2 | 14 | 40 | 4 |
| 3 | 14 | 80 | 8 |
| 4 | 14 | 160 | 16 |
| 5 | 14 | 320 | 32 |

In NR, one component carrier (CC) or serving cell can include up to 250 RBs. Therefore, when a UE always receives the entire serving cell bandwidth as in LTE, the power consumption of the UE may be extreme. To solve this problem, a base station may configure one or more bandwidth parts (BWP) for the UE, thus supporting the UE in changing a reception region in the cell.

In NR, the base station may configure an initial BWP, which is the bandwidth of CORESET #0 (or a common search space: CSS), for the UE through a master information block (MIB). Subsequently, the base station may configure a first BWP for the UE through RRC signaling and may report at least one piece of BWP configuration information that may be indicated through downlink control information (DCI) in the future. The base station may report a BWP ID through DCI, thereby indicating a band for the UE to use. When the UE fails to receive the DCI in the currently allocated BWP for a specified time or longer, the UE returns to a default BWP and attempts to receive the DCI.

Figure 3:
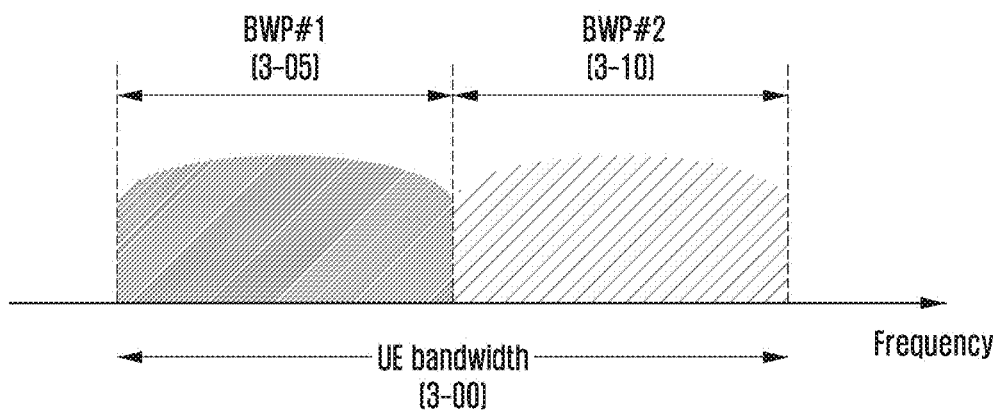
FIG. 3 illustrates the configuration of a BWP in a wireless communication system according to an embodiment of the disclosure.

FIG. 3 illustrates the configuration of a BWP in a wireless communication system according to an embodiment.

Referring to FIG. 3, a UE bandwidth 3-00 may include two BWPs, that is, BWP #1 3-05 and BWP #2 3-10. A base station may configure one BWP or a plurality of BWPs for a UE and may configure pieces of information about each BWP as follows in Table 2.

TABLE 2

| Configuration information 1 | Bandwidth of a BWP (the number of PRBs included in the BWP) |
|---|---|
| Configuration information 2 | Frequency position of a BWP (e.g., an offset value relative to reference point A, in which the reference point may be, for example, the center frequency of a carrier, a synchronization signal, a synchronization signal raster, or the like) |
| Configuration information 3 | Numerology of a BWP (e.g., subcarrier spacing, cyclic prefix (CP) length, or the like) |
| Other information | |

In addition to the pieces of configured information illustrated in Table 2, various parameters related to the BWP may be configured for the UE. The foregoing pieces of information may be transmitted from the base station to the UE through higher-layer signaling, for example, RRC signaling. At least one of the one configured BWP or the plurality of configured BWPs may be activated. Whether to activate a configured BWP may be indicated from the base station to the UE semi-statically through RRC signaling or dynamically through a MAC control element (CE) or DCI.

The configuration of the BWP supported by the 5G communication system may be used for various purposes.

In one example, when a bandwidth supported by a UE is smaller than a system bandwidth, the bandwidth supported by the UE may be supported by configuring a BWP. For example, the frequency position of the BWP (configuration information 2) in Table 2 may be set for the UE, enabling the UE to transmit and receive data at a particular frequency position within the system bandwidth.

In another example, a base station may configure a plurality of BWPs for a UE in order to support different numerologies. For example, in order to support data transmission and reception using both a subcarrier spacing of 15 kHz and a subcarrier spacing of 30 kHz for a random UE, two BWPs may be configured to use a subcarrier spacing of 15 kHz and a subcarrier spacing of 30 kHz, respectively. Different BWPs may be subjected to frequency division multiplexing (FDM). When the UE intends to transmit and receive data with particular subcarrier spacing, a BWP configured with the subcarrier spacing may be activated.

In still another example, a base station may configure BWPs having different bandwidths for a UE in order to reduce power consumption of the UE. For example, when a UE supports a very large bandwidth, for example, a bandwidth of 100 MHz, and always transmits and receives data in the bandwidth, the UE may consume great power. In particular, it is very inefficient in power consumption that the UE unnecessarily monitors a downlink control channel over the large bandwidth of 100 MHz even when there is no traffic. Therefore, in order to reduce power consumption of the UE, the base station may configure a BWP having a relatively small bandwidth, for example, a BWP of 20 MHz, for the UE. The UE may perform a monitoring operation in the 20-MHz BWP in the absence of traffic, and the UE may transmit and receive data using the 100-MHz bandwidth according to an indication from the base station when the data is generated.

Figure 4:
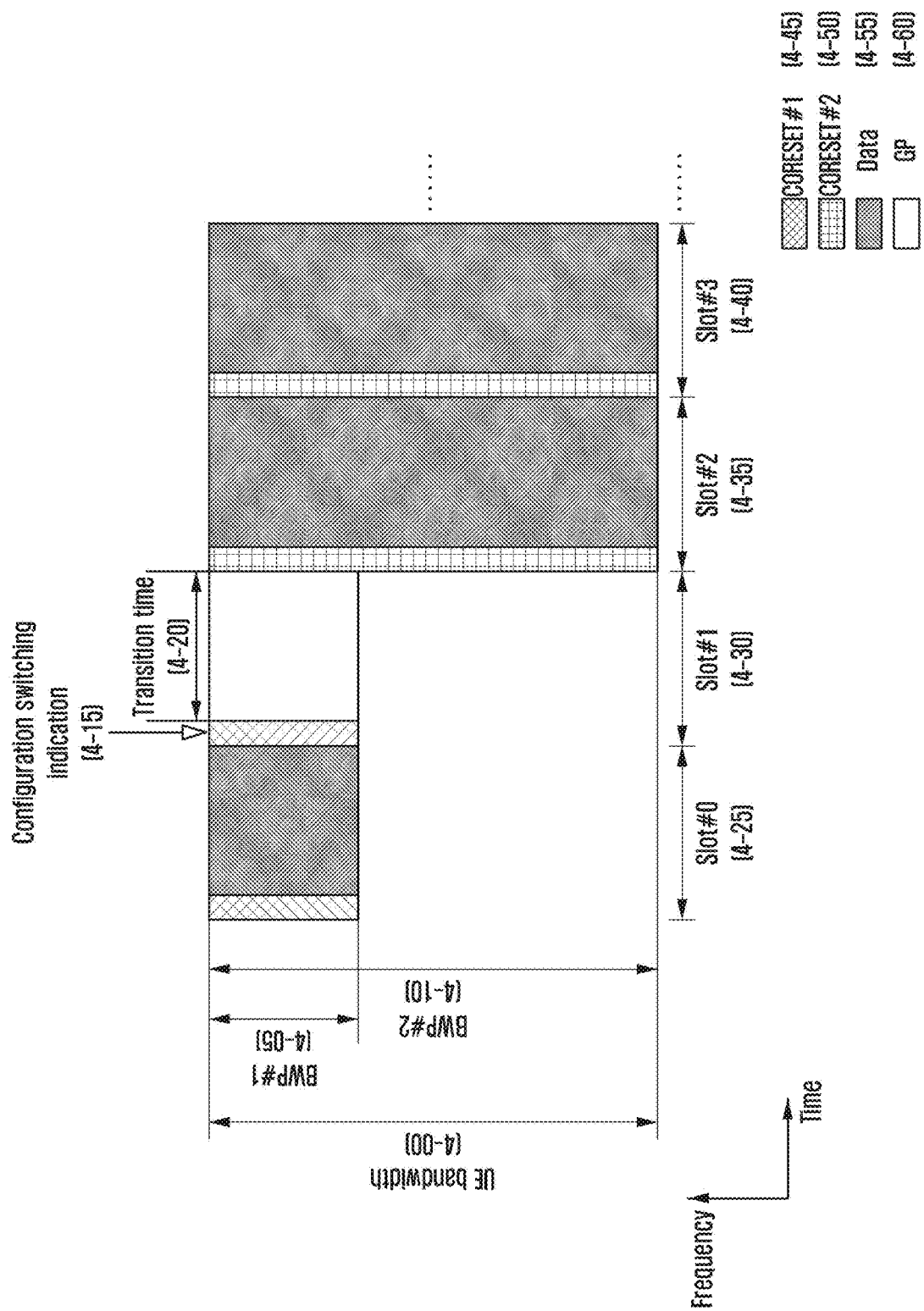
FIG. 4 illustrates a method of dynamically changing the configuration of a BWP according to an embodiment of the disclosure.

FIG. 4 illustrates a method of dynamically changing the configuration of a BWP according to an embodiment of the disclosure.

Referring to FIG. 4, as described in Table 2, a base station may configure one BWP or a plurality of BWPs for a UE and may report, as the configuration of each BWP, information about the bandwidth of the BWP, the frequency position of the BWP, and the numerology of the BWP to the UE. As illustrated in FIG. 4, which two BWPs, which are BPW #1 4-05 and BWP #2 4-10, are configured in the UE bandwidth 4-00 for one UE. One or a plurality of the configured BWPs may be activated, and FIG. 4 shows an example in which one BWP is activated. BWP #1 4-02 of the configured BWPs is activated in slot #0 4-25, and the UE may monitor a physical downlink control channel (PDCCH) in control region 1 4-55 configured in BWP #1 4-05 and may transmit and receive data 4-55 in BWP #1 4-05. The control region in which the UE receives the PDCCH may vary according to which BWP is activated among the configured BWPs, and thus the bandwidth in which the UE monitors the PDCCH may vary.

The base station may further transmit an indicator for switching the configuration of a BWP to the UE. Here, switching the configuration of a BWP may be considered the same as activating a particular BWP (e.g., switching an activated BWP from BWP A to BWP B). The base station may transmit a configuration switching indicator to the UE in a particular slot. After receiving the configuration switching indicator from the base station, the UE may determine a BWP to be activated by applying a changed configuration according to the configuration switching indicator from a particular time. Further, the UE may monitor a PDCCH in a control region configured in the activated BWP.

In FIG. 4, the base station may transmit a configuration switching indicator 4-15 indicating a switch of the activated BWP from existing BWP #1 4-05 to BWP #2 4-10 to the UE in slot #1 4-30. After receiving the indicator, the UE may activate BWP #2 4-10 according to the content of the indicator. Here, a transition time 4-20 for a BWP switch may be required, and the time to switch and apply a BWP to be activated may be determined accordingly. In FIG. 4, a transition time 4-20 of one slot is required after receiving the configuration switching indicator 4-15. Data transmission and reception may not be performed in the transition time 4-20 (4-60). Accordingly, BWP #2 4-10 may be activated in slot #2 4-35, and thus a control channel and data may be transmitted and received via the BWP.

The base station may pre-configure one BWP or a plurality of BWPs for the UE via higher-layer signaling (e.g., RRC signaling) and may indicate activation by mapping the configuration switching indicator 4-15 with one of BWP configurations preconfigured by the base station. For example, a $\log_2 N$-bit indicator may indicate one BWP selected from among N preconfigured BWPs. Table 3 shows an example of indicating configuration information about a BWP using a two-bit indicator.

TABLE 3

| Indicator value | BWP configuration |
|---|---|
| 00 | Bandwidth configuration A configured via higher-layer signaling |
| 01 | Bandwidth configuration B configured via higher-layer signaling |
| 10 | Bandwidth configuration C configured via higher-layer signaling |
| 11 | Bandwidth configuration D configured via higher-layer signaling |

The configuration switching indicator 4-15 for the BWP illustrated in Table 4 may be transmitted from the base station to the UE via medium access control (MAC) control element (CE) signaling or L1 signaling (e.g., common DCI, group-common DCI, or UE-specific DCI).

The time to apply BWP activation according to the foregoing configuration switching indicator 4-15 for the BWP illustrated in Table 4 may depend on the following. The time to apply a configuration switch may depend on a predefined value (e.g., the configuration switch is applied after N (≥1) slots since receiving the configuration switching indicator), may set by the base station for the UE via higher-layer signaling (e.g., RRC signaling), or may be transmitted via the configuration switching indicator 4-15. Further, the time to apply the configuration switch may be determined by combining the above methods. After receiving the configuration switching indicator 4-15 for the BWP, the UE may apply a switched configuration from the time obtained by the above method.

Figure 5:
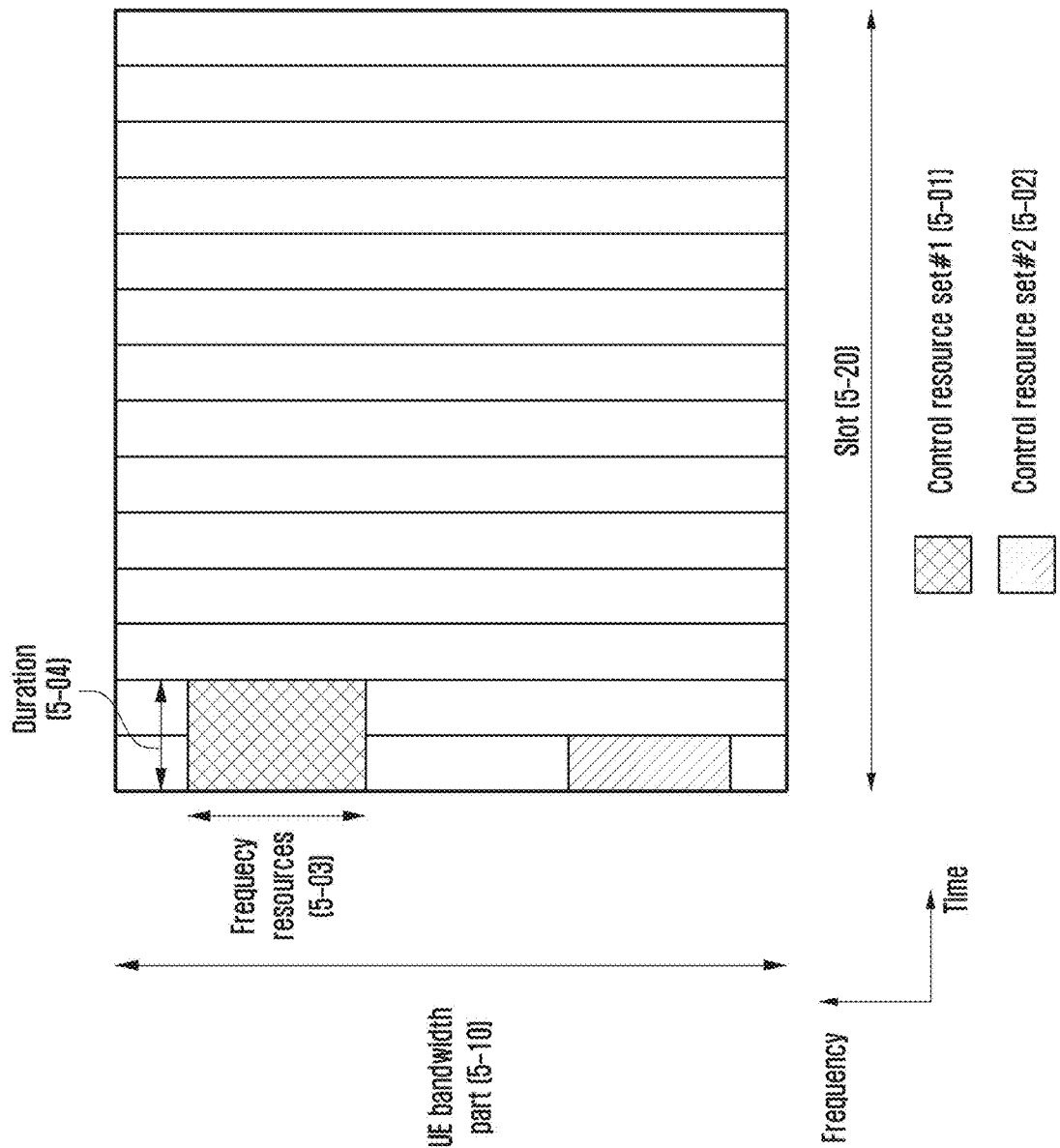
FIG. 5 illustrates a control resource set (CORESET) in which a downlink control channel is transmitted in a 5G system according to an embodiment of the disclosure.

FIG. 5 illustrates a control resource set (CORESET) in which a downlink control channel is transmitted in a 5G system according to an embodiment of the disclosure.

Referring to FIG. 5, in the embodiment, a UE BWP 5-10 may be configured on a frequency axis, and two control resource sets (control resource set #1 5-01 and control resource set #2 5-02) may be configured in one slot 5-20 on a time axis. The control resource sets 5-01 and 5-02 may be configured in a particular frequency resource 5-03 in the entire UE BWP 5-10 on the frequency axis. The control resource sets 5-01 and 5-02 may be configured with one or a plurality of OFDM symbols on the time axis, which may be defined as control region set duration 5-04. In an example of FIG. 5, control resource set #1 5-01 is configured with a control resource set duration of two symbols, and control resource set #2 5-02 is configured with a control resource set duration of one symbol.

The control resource set in the 5G system described above may be configured by a base station for a UE through higher-layer signaling (e.g., system information, a master information block (MIB), or radio resource control (RRC) signaling). Configuring a control resource set for a UE means that information, such as the identity of the control resource set, a frequency position of the control resource set, and the symbol duration of the control resource set, is provided for the UE. For example, information for configuring the control resource set for a UE may include pieces of information illustrated in Table 4.

TABLE 4

```
ControlResourceSet ::=                SEQUENCE {
Corresponds to L1 parameter 'CORESET-ID'
controlResourceSetId                  ControlResourceSetId,
(Control region identity)
frequencyDomainResources              BIT STRING (SIZE (45)),
(Frequency-domain resource allocation information)
duration                              INTEGER
(1..maxCoReSetDuration),
    (Time-domain resource allocation information)
    cce-REG-MappingType               CHOICE {
    (CCE-to-REG mapping type)
    interleaved                       SEQUENCE {
    reg-Bundle Size                   ENUMERATED {n2, n3,
n6},
    (REG bundle size)
    precoderGranularity               ENUMERATED
{sameAsREG-bundle, allContiguousRBs},
    interleaverSize                   ENUMERATED {n2, n3,
n6}
    (Interlever size)
    shiftIndex
  INTEGER(0..maxNrofPhysicalResourceBlocks–
1)                                    OPTIONAL
    (Interlever shift)
    },
    nonInterleaved                    NULL
    },
    tci-StatesPDCCH                   SEQUENCE(SIZE
(1..maxNrofTCI-StatesPDCCH)) OF TCI-StateId
  OPTIONAL,
    (QCL configuration information)
    tci-PresentInDCI                  ENUMERATED
{enabled}                             OPTIONAL, --
Need S
    }
```

In Table 4, tci-StatesPDCCH (simply referred to as a TCI state) configuration information may include information about the index of one or a plurality of synchronization signals (SSs)/physical broadcast channel (PBCH) blocks (referred to as SSBs or SS/PBCH blocks) in a quasi co-located (QCL) relationship with a demodulation reference signal (DMRS) transmitted in the control resource set or the index of a channel state information reference signal (CSI-RS).

In a wireless communication system, one or more different antenna ports (which may be replaced with one or more channels, signals, and combinations thereof but the term 'different antenna ports' is collectively used for convenience in the following description of the disclosure) may be associated with each other by the following QCL configuration.

```
    QCL-Info ::=           SEQUENCE {
    cell              ServCellIndex (Index of serving cell in
which QCL reference RS is transmitted)
    bwp-Id            BWP-Id (Index of BWP in which QCL
reference RS is transmitted)
    referenceSignal       CHOICE { (Indicator indicating either
CSI-RS or SS/PBCH block as QCL reference RS)
    csi-rs            NZP-CSI-RS-ResourceId,
    ssb               SSB-Index
    },
    qcl-Type              ENUMERATED {typeA, typeB, typeC,
typeD}, (QCL type indicator)
    ...
}
```

Specifically, the QCL configuration may connect two different antenna ports in a relationship between a (QCL) target antenna port and a (QCL) reference antenna port, and the UE may apply (assume) all or some of statistical characteristics (e.g., a large scale parameter of a channel or a reception space filter coefficient or transmission space filter coefficient of the UE, such as a Doppler shift, a Doppler spread, an average delay, a delay spread, an average gain, and a spatial Rx (or Tx) parameter) of a channel measured at the reference antenna port when receiving the target antenna port. Here, the target antenna port refers to an antenna port transmitting a channel or signal configured by a higher-layer configuration including the QCL configuration, or an antenna port transmitting a channel or signal to which a TCI state indicating the QCL configuration is applied. The reference antenna port refers to an antenna port transmitting a channel or signal indicated (specified) by a referenceSignal parameter in the QCL configuration.

Specifically, statistical characteristics of a channel defined by the QCL configuration (indicated by a parameter qcl-Type in the QCL configuration) may be classified according to a QCL type as follows.

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

QCL types are not limited to the above four types, but all possible combinations are not listed in order not to obscure the gist of the description. QCL-TypeA is a QCL type used when all statistical characteristics measurable on the frequency and time axes are available for reference as the bandwidth and the transmission period of the target antenna port are sufficient compared to the reference antenna port (i.e., when the number of samples and the transmission band/time of the target antenna port are greater than the number of samples and the transmission band/time of the reference antenna port on both the frequency axis and the time axis). QCL-TypeB is a QCL type used when the bandwidth of the target antenna port is sufficient to measure statistical characteristics measurable on the frequency axis, that is, a Doppler shift and a Doppler spread. QCL-TypeC is a QCL type used when the bandwidth and the transmission period of the target antenna port are insufficient to measure second-order statistics, that is, a Doppler spread and a delay spread, and thus only first-order statistics, that is, a Doppler shift and an average delay, are available for reference. QCL-TypeD is a QCL type configured when spatial Rx filter values used when receiving the reference antenna port can be used when receiving the target antenna port.

The base station can configure or indicate up to two QCL configurations for one target antenna port through the following TCI state configuration.

```
    TCI-State ::=         SEQUENCE {
    tci-StateId           TCI-StateId, (TCI state indicator)
    qcl-Type1             QCL-Info, (First QCL configuration for
target antenna port to which TCI state is applied)
    qcl-Type2             QCL-Info (Second QCL configuration
for target antenna port to which TCI state is applied)
    OPTIONAL, -- Need R
    ...
}
```

Among the two QCL configurations included in one TCI state configuration, a first QCL configuration may be configured to one of QCL-TypeA, QCL-TypeB, and QCL-TypeC. A configurable QCL type is specified according to the types of a target antenna port and a reference antenna port, which will be described in detail below. A second QCL configuration among the two QCL configurations included in the one TCI state configuration may be configured to QCL-TypeD, and may be omitted in some cases.

Tables 4-1 to 4-5 illustrate valid TCI state configurations according to the type of a target antenna port.

Table 4-1 shows a valid TCI state configuration when the target antenna port is a CSI-RS for tracking (or tracking reference signal: TRS). The TRS refers to an NZP CSI-RS in which a repetition parameter is not configured and trs-Info is configured to true among CSI-RSs. In Table 4-1, configuration 3 may be used for an aperiodic TRS.

TABLE 4-1

Valid TCI state configuration when target antenna port is CSI-RS for tracking (TRS)

| Valid TCI state Configuration | DL RS 1 | qcl-Type1 | DL RS 2 (if configured) | qcl-Type2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 4-2 shows a valid TCI state configuration when the target antenna port is a CSI-RS for CSI. The CSI-RS for CSI refers to an NZP CSI-RS in which a repetition parameter is not configured and trs-Info is not configured to true among CSI-RSs.

TABLE 4-2

Valid TCI state configuration when target antenna port is CSI-RS for tracking (TRS)

| Valid TCI state Configuration | DL RS 1 | qcl-Type1 | DL RS 2 (if configured) | qcl-Type2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 4-3 shows a valid TCI state configuration when the target antenna port is a CSI-RS for beam management (BM, equivalent to a CSI-RS for L1 RSRP reporting). The CSI-RS for BM refers to an NZP CSI-RS in which a repetition parameter is configured to an on or off value and trs-Info is not configured to true among CSI-RSs.

TABLE 4-3

Valid TCI state configuration when target antenna port is CSI-RS for BM (for L1_RSRP reporting)

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 4-4 shows a valid TCI state configuration when the target antenna port is a PDCCH DMRS.

TABLE 4-4

Valid TCI state configuration when target antenna port is PDCCH DMRS

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 4-5 shows a valid TCI state configuration when the target antenna port is a PDSCH DMRS.

TABLE 4-5

Valid TCI state configuration when target antenna port is PDSCH DMRS

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

Representative QCL configuration methods according to Tables 4-1 to 4-5 configure the target antenna port and the reference antenna port to "SSB"→"TRS"→"CSI-RS for CSI, CSI-RS for BM, PDCCH DMRS, or PDSCH DMRS" in each phase and operate the same. Accordingly, it is possible to link statistical characteristics measurable from the SSB and the TRS to each antenna port, thus helping a reception operation of the terminal.

Hereinafter, methods for allocating time and frequency resources for data transmission in an NR system will be described.

The NR system may provide the following specific frequency-domain resource allocations (FD-RAs) in addition to frequency-domain resource candidate allocation through a BWP indication.

Figure 6:
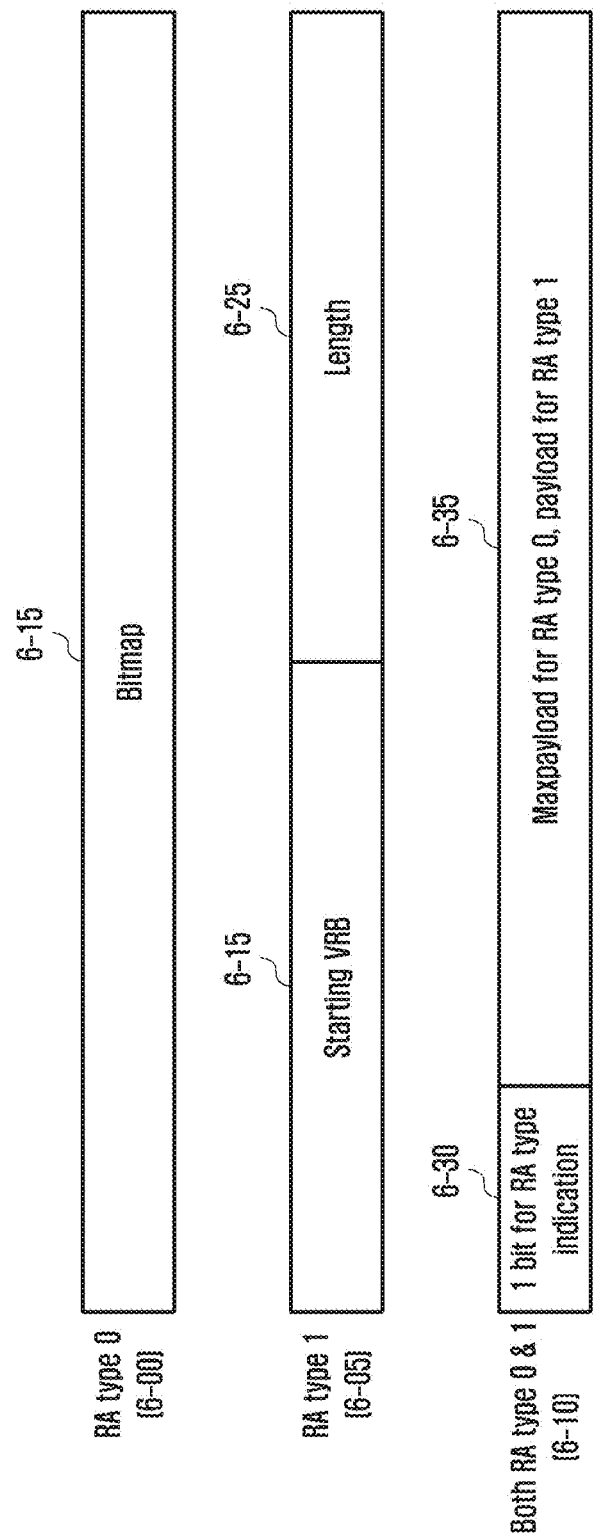
FIG. 6 illustrates a PDSCH frequency-domain resource allocation method in an NR system according to an embodiment of the disclosure.

FIG. 6 illustrates a PDSCH frequency-domain resource allocation method in the NR system according to an embodiment of the disclosure.

Referring to FIG. 6, in the NR system, as frequency-domain resource allocation methods, type 0 6-00, type 1 6-05, and a dynamic switch 6-10 that may be configured through a higher layer may be included.

When a UE is configured to use only resource type 0 through higher-layer signaling (6-00), some downlink control information (DCI) for allocating a PDSCH to the UE has a bitmap of NRBG bits, a condition for which will be described later. Here, NRBG denotes the number of resource block groups (RBGs) determined as in Table 5 according to a BWP size allocated by a BWP indicator and a higher-layer parameter rbg-Size, and the RBG phase indicated by 1 by the bitmap, and data is transmitted on an RBG indicated by 1 according to the bitmap.

TABLE 5

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

When the UE is configured to use only resource type 1 6-05 through higher-layer signaling, some DCI for allocating a PDSCH to the UE has frequency-domain resource allocation information of $\lceil \log_2(N_{RB}^{DL,BWP}(NR_{RB}^{DL,BWP}+1)/2) \rceil$ bits, a condition for which will be described later. Through this information, the base station can configure a starting VRB 6-20 and the length 6-25 of frequency-domain resources consecutively allocated therefrom.

When the UE is configured to use both resource type 0 and resource type 1 through higher-layer signaling (6-10), some DCIs for allocating a PDSCH to the UE has frequency-domain resource allocation information of bits of a greater value 6-35 among a payload 6-15 for configuring resource type 0 and payloads 6-20 and 6-25 for configuring resource type 1, a condition for which will be described later. Here, one bit may be added to the most significant bit (MSB) of the frequency-domain resource allocation information in the DCI, in which the bit equal to 0 may indicate that resource type 0 is used, and the bit equal to 1 may indicate that resource type 1 is used.

Figure 7:
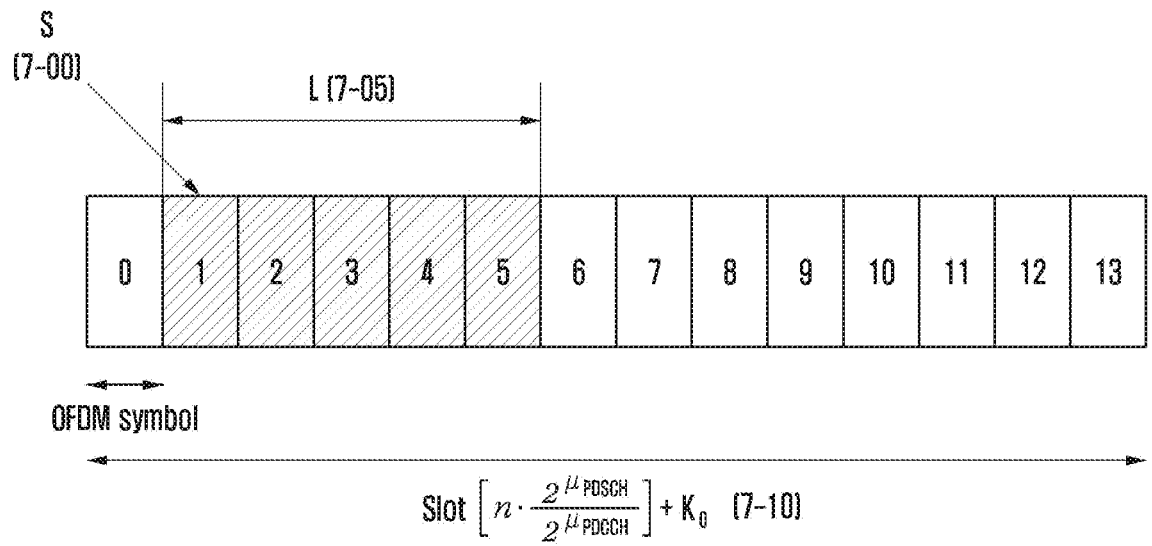
FIG. 7 illustrates a physical downlink shared channel (PDSCH) time-domain resource allocation method in a wireless communication system according to an embodiment of the disclosure.

FIG. 7 illustrates a physical downlink shared channel (PDSCH) time-domain resource allocation method in a wireless communication system according to an embodiment of the disclosure.

Referring to FIG. 7, a base station may indicate a time-domain position of a PDSCH resource according to the start position 7-00 and the length 7-05 of an OFDM symbol in a slot dynamically indicated through the subcarrier spacing (μPDSCH, μPDCCH) of a data channel and a control channel configured using a higher layer, a scheduling offset ($K_0$) value, and DCI.

Figure 8:
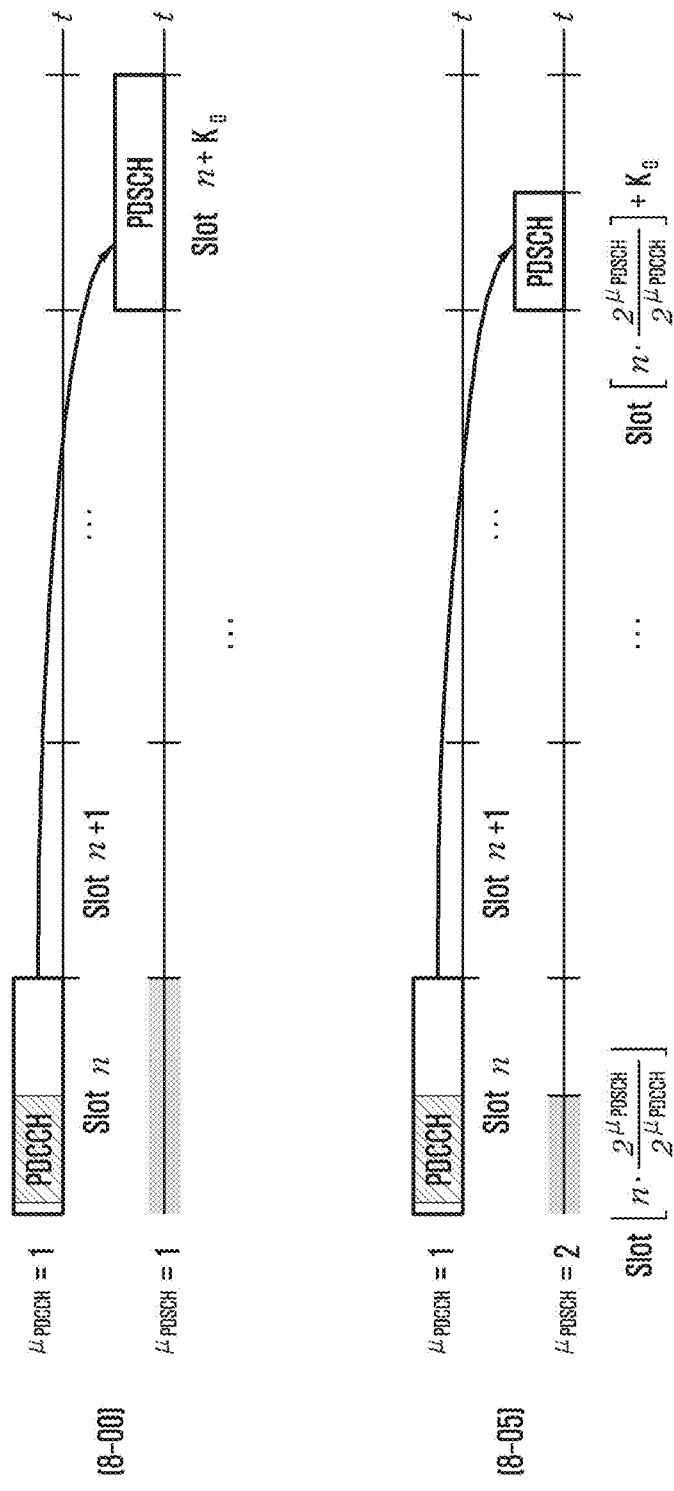
FIG. 8 illustrates a time-domain resource allocation method according to the subcarrier spacing of a data channel and the subcarrier spacing of a control channel in a wireless communication system according to an embodiment of the disclosure.

FIG. 8 illustrates a time-domain resource allocation method according to the subcarrier spacing of a data channel and the subcarrier spacing of a control channel in a wireless communication system according to an embodiment of the disclosure.

Referring to FIG. 8, when a data channel and a control channel have the same subcarrier spacing (8-00, μPDSCH=μPDCCH), since a data slot number and a control slot number are the same, a base station and a UE recognize that a scheduling offset occurs in accordance with predetermined slot offset $K_0$.

When the subcarrier spacing of the data channel and the subcarrier spacing of the control channel are different (8-05, μPDSCH≠μPDCCH), since a data slot number and a control slot number are different, the base station and the UE recognize that a scheduling offset occurs in accordance with predetermined slot offset $K_0$, based on the subcarrier spacing of the PDCCH.

In an NR system, for efficient control channel reception of a UE, various types of DCI formats as shown in Table 6 are provided according to purposes.

TABLE 6

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

For example, the base station may use DCI format 0_0 or DCI format 0_1 to schedule a PDSCH for one cell.

DCI format 0_1 includes at least the following pieces of information when transmitted together with a CRC scrambled with a cell radio network temporary identifier (C-RNTI), a configured scheduling RNTI (CS-RNTI), or a new-RNTI.

- Identifier for DCI formats (1 bit): DCI format indicator, which is always set to 1.
- Frequency domain resource assignment ($N_{RBG}$ bits or $\lceil \log_2(N_{RB}^{DL,BWP}(NR_{RB}^{DL,BWP}+1)/2) \rceil$ bits): Indicates frequency-domain resource allocation. When DCI format 1_0 is monitored in a UE-specific search space, $N_{RB}^{DL,BWP}$ is the size of an active DL BWP; otherwise, $N_{RB}^{DL,BWP}$ is the size of an initial DL BWP. $N_{RBG}$ is the number of resource block groups. A detailed method is illustrated in the foregoing frequency-domain resource allocation.
- Time domain resource assignment (0 to 4 bits): Indicates time-domain resource allocation according to the foregoing description.
- VRB-to-PRB mapping (1 bit): 0 indicates non-interleaved VRP-to-PRB mapping, and 1 indicates interleaved VRP-to-PRB mapping.
- Modulation and coding scheme (5 bits): Indicates a modulation order and a coding rate used for PDSCH transmission.
- New data indicator (1 bit): Indicates whether a PDSCH corresponds to initial transmission or retransmission depending on toggling.
- Redundancy version (2 bits): Indicates a redundancy version used for PDSCH transmission.
- HARQ process number (4 bits): Indicates an HARQ process number used for PDSCH transmission.
- Downlink assignment index (DAI) (2 bits): DAI indicator.
- TPC command for scheduled PUCCH (2 bits): PUCCH power control indicator.
- PUCCH resource indicator (3 bits): PUCCH resource indicator, which indicates one of eight resources configured via a higher layer.
- PDSCH-to-HARQ feedback timing indicator (3 bits): HARQ feedback timing indicator, which indicates one of eight feedback timing offsets configured via a higher layer.

DCI format 1_1 includes at least the following pieces of information when transmitted together with a CRC scrambled with a cell radio network temporary identifier (C-RNTI), a configured scheduling RNTI (CS-RNTI), or a new-RNTI.

Identifier for DCI formats (1 bit): DCI format indicator, which is always set to 1.

Carrier indicator (0 or 3 bits): Indicates a CC (or cell) in which a PDSCH allocated by DCI is transmitted.

Bandwidth part indicator (0, 1, or 2 bits): Indicates a BWP in which a PDSCH allocated by DCI is transmitted.

Frequency domain resource assignment (payload is determined according to the foregoing frequency-domain resource allocation): Indicates frequency-domain resource allocation. $N_{RB}^{DL,BWP}$ is the size of an active DL BWP. A detailed method is illustrated in the foregoing frequency-domain resource allocation.

Time domain resource assignment (0 to 4 bits): Indicates time-domain resource allocation according to the foregoing description.

VRB-to-PRB mapping (0 or 1 bit): 0 indicates non-interleaved VRP-to-PRB mapping, and 1 indicates interleaved VRP-to-PRB mapping. When frequency-domain resource allocation is set to resource type 0, this information is 0 bits.

PRB bundling size indicator (0 or 1 bit): When higher-layer parameter prb-BundlingType is not set or is set to 'static', this information is 0 bits; when higher-layer parameter prb-BundlingType is set to 'dynamic', this information is 1 bit.

Rate matching indicator (0, 1, or 2 bits): Indicates a rate matching pattern.

ZP CSI-RS trigger (0, 1, or 2 bits): Indicator triggering an aperiodic ZP CSI-RS.

For transport block 1:

Modulation and coding scheme (5 bits): Indicates a modulation order and a coding rate used for PDSCH transmission.

New data indicator (1 bit): Indicates whether a PDSCH corresponds to initial transmission or retransmission depending on toggling.

Redundancy version (2 bits): Indicates a redundancy version used for PDSCH transmission For transport block 2:

Modulation and coding scheme (5 bits): Indicates a modulation order and a coding rate used for PDSCH transmission.

New data indicator (1 bit): Indicates whether a PDSCH corresponds to initial transmission or retransmission depending on toggling.

Redundancy version (2 bits): Indicates a redundancy version used for PDSCH transmission.

HARQ process number (4 bits): Indicates an HARQ process number used for PDSCH transmission.

Downlink assignment index (0, 2, or 4 bits): DAI indicator.

TPC command for scheduled PUCCH (2 bits): PUCCH power control indicator.

PUCCH resource indicator (3 bits): PUCCH resource indicator, which indicates one of eight resources configured via a higher layer.

PDSCH-to-HARQ feedback timing indicator (3 bits): HARQ feedback timing indicator, which indicates one of eight feedback timing offsets configured via a higher layer.

Antenna port (4, 5, or 6 bits): Indicates a DMRS port and a CDM group without data.

Transmission configuration indication (0 or 3 bits): TCI indicator.

SRS request (2 or 3 bits): SRS transmission request indicator.

CBG transmission information (0, 2, 4, 6, or 8 bits): Indicator indicating whether code block groups in an allocated PDSCH are transmitted. 0 indicates that the CBGs are not transmitted, and 1 indicates that the CBGs are transmitted.

CBG flushing-out information (0 or 1 bit): Indicator indicating whether previous CBGs are contaminated. 0 indicates that the CBGs may be contaminated, and 1 indicates that the CBGs may be combinable in retransmission reception.

DMRS sequence initialization (0 or 1 bit): DMRS scrambling ID selection indicator.

The number of pieces of DCI having different sizes that a UE can receive per slot in a cell is up to 4. The number of pieces of DCI having different sizes scrambled with a C-RNTI that a UE can receive per slot in a cell is up to 3.

The antenna port indication may be indicated through Tables 7 to 10.

TABLE 7

Antenna port(s) (1000 + DMRS port), dmrs-Type = 1, maxLength = 1
One Codeword:
Codeword 0 enabled,
Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

TABLE 8

Antenna port(s) (1000 + DMRS port), dmrs-Type = 1, maxLength = 2

| | One Codeword: Codeword 0 enabled, Codeword 1 disabled | | | Two Codewords: Codeword 0 enabled, Codeword 1 enabled | | |
|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

TABLE 9

Antenna port(s) (1000 + DMRS port), dmrs-Type = 2, maxLength = 1

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24-31 | Reserved | Reserved | | | |

TABLE 10

Antenna port(s) (1000 + DMRS port), dmrs-Type = 2, maxLength = 2

| One codeword: Codeword 0 enabled, Codeword 1 disabled | | | | Two Codewords: Codeword 0 enabled, Codeword 1 enabled | | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

A used DMRS port is indicated using Table 7 when dmrs-type is 1 and maxLength is 1, Table 8 when dmrs-Type=1, maxLength=2, Table 9 when dmrs-type=2, maxLength=1, and Table 10 when drms-tpye is 2 and maxLength is 2. In the tables, numbers 1, 2, and 3 indicated by Number of DMRS CDM group(s) without data refer to CDMR groups {0}, {0, 1}, and {0, 1, 2}, respectively. The DMRS port(s) is arranged in order according to the index of a port used. An antenna port is indicated by DMRS port+1000. A CDM group of a DMRS is connected to a method for generating a DMRS sequence and an antenna port as illustrated in Tables 11 and 12. Table 11 illustrates a parameter when dmrs-type=1 is used, and Table 12 illustrates a parameter when dmrs-type=2 is used.

TABLE 11

Parameters for PDSCH DM-RS dmrs-type = 1

| p | CDM group λ | Δ | w_f(k') k' = 0 | w_f(k') k' = 1 | w_t(l') l' = 0 | w_t(l') l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 12

Parameters for PDSCH DM-RS dmrs-type = 2

| p | CDM group λ | Δ | w_f(k') k' = 0 | w_f(k') k' = 1 | w_t(l') l' = 0 | w_t(l') l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

A DMRS sequence according to a parameter may be determined by Equation 1.

$$a_{k,l}^{(p,\mu)} = \beta_{PDSCH}^{DMRS} w_f'(k')w_{l'}(l')r(2n + k') \quad \text{(Equation 1)}$$

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

When only one codeword is enabled in Tables 7 and 8, rows 2, 9, 10, 11, and 30 may be used only for single-user MIMO. That is, a UE may not assume that a different UE is co-scheduled and may not perform a multi-user MIMO reception operation, such as multi-user interference cancelation, nulling, or whitening does.

When only one codeword is enabled in Tables 9 Table 10, rows 2, 10, and 23 may be used only for single-user MIMO. That is, a UE may not perform a multi-user MIMO reception operation, such as multi-user interference cancellation, nulling, or whitening, not assuming that a different UE is co-scheduled.

Figure 9:
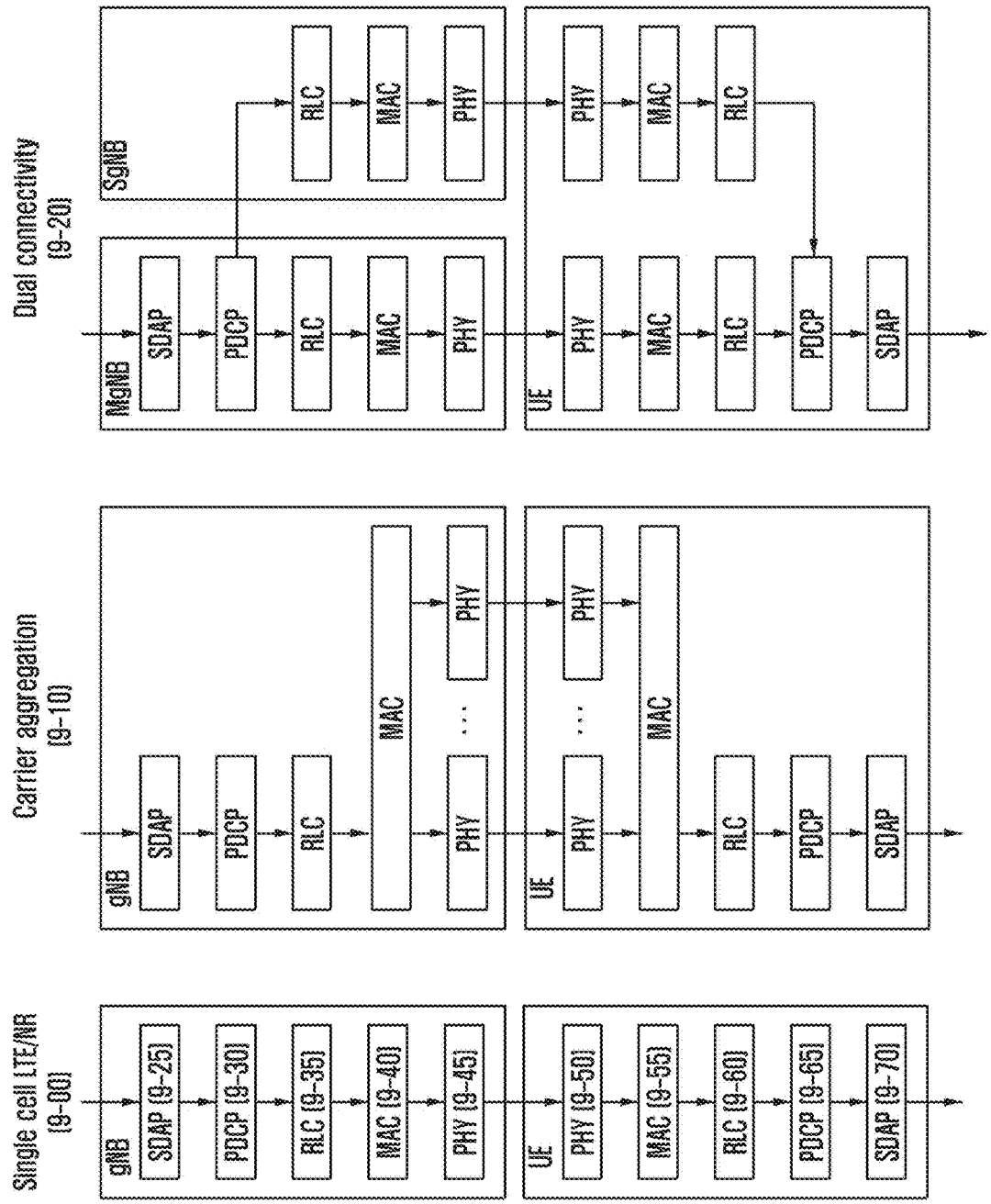
FIG. 9 illustrates the wireless protocol structures of a base station and a UE when single cell, carrier aggregation (CA), dual connectivity (DC) are performed according to an embodiment of the disclosure.

FIG. 9 illustrates the wireless protocol structures of a base station and a UE when single cell, carrier aggregation (CA), dual connectivity (DC) are performed according to an embodiment of the disclosure.

Referring to FIG. 9, a wireless protocol of an NR system may include NR service data adaptation protocols (SDAPs) 9-25 and 9-70, NR packet data convergence protocols (PDCPs) 9-30 and 9-65, NR radio link controls (RLCs) 9-35 and 9-60, and NR medium access controls (MACs) 9-40 and 9-55 respectively at a UE and an NR base station.

Main functions of the NR SDAPs 9-25 and 9-70 may include at least some of the following functions.
  Transfer of user plane data
  Mapping between QoS flow and DRB for both DL and UL
  Marking QoS flow ID in both DL and UL packets
  Reflective QoS flow-to-DRB mapping for UL SDAP PDUs Regarding the SDAP-layer devices, the UE may receive a configuration about whether to use a header of the SDAP-layer devices or whether to use a function of the SDAP-layer devices for each PDCP-layer device, each bearer, or each logical channel via an RRC message. When an SDAP header is configured, the base station may use a one-bit NAS QoS reflective indicator (NAS reflective QoS) and a one-bit AS QoS reflective indicator (AS reflective QoS) of the SDAP header for indication to enable the UE to update or reconfigure uplink and downlink QoS flows and mapping information for a data bearer. The SDAP header may include QoS flow ID information indicating QoS. The QoS information may be used as a data processing priority, scheduling information, and the like in order to support a desired service.

Main functions of the NR PDCPs 9-30 and 9-65 may include at least some of the following functions.
  Header compression and decompression (ROHC only)
  Transfer of user data
  In-sequence delivery of higher-layer PDUs
  Out-of-sequence delivery of higher-layer PDUs
  PDCP PDU reordering for reception
  Duplicate detection of lower-layer SDUs
  Retransmission of PDCP SDUs
  Ciphering and deciphering
  Timer-based SDU discard in uplink.

Among the above functions, the reordering function of the NR PDCP devices refers to a function of rearranging PDCP PDUs received in a lower layer in order on the basis of the PDCP sequence number (SN). The reorder function may include a function of transmitting the data to a higher layer in the order of rearrangement or a function of immediately transmitting the data regardless of order. In addition, the reordering function may include a function of recording lost PDCP PDUs via reordering, may include a function of reporting the state of lost PDCP PDUs to a transmitter, and may include a function of requesting retransmission of lost PDCP PDUs.

Main functions of the NR RLCs 9-35 and 9-60 may include at least some of the following functions.
  Transfer of higher-layer PDUs
  In-sequence delivery of higher-layer PDUs
  Out-of-sequence delivery of higher-layer PDUs
  Error Correction through ARQ
  Concatenation, segmentation, and reassembly of RLC SDUs
  Re-segmentation of RLC data PDUs
  Reordering of RLC data PDUs
  Duplicate detection
  Protocol error detection
  RLC SDU discard
  RLC re-establishment Among the above functions, the in-sequence delivery function of the NR RLC devices refers to a function of delivering RLC SDUs received from a lower layer to a higher layer in order. The in-sequence delivery function may include a function of reassembling and delivering a plurality of RLC SDUs when one original RLC SDU is divided into the plurality of RLC SDUs to be received. Further, the in-sequence delivery function may include a function of rearranging received RLC PDUs on the basis of the RLC SN or the PDCP SN and may include a function of recording lost RLC PDUs via reordering. In addition, the in-sequence delivery function may include a function of reporting the state of lost RLC PDUs to a transmitter, may include a function of requesting retransmission of lost RLC PDUs, and, if there is a lost RLC SDU, may include a function of delivering only RLC SDUs before the lost RLC SDU to a higher layer in order. Furthermore, the in-sequence delivery function may include a function of delivering all RLC SDUs, received before a timer starts, to a higher layer in order when the timer has expired despite the presence of a lost RLC SDU, or may include a function of delivering all RLC SDUs received so far to a higher layer in order when the timer expires despite the presence of a lost RLC SDU. Further, according to the in-sequence delivery function, the NR RLC devices may process RLC PDUs in order of reception (the order of arrival regardless of the order of SNs) and may deliver the RLC PDUs to the PDCP devices in an out-of-sequence manner. When a segment is received, the in-sequence delivery function enables the NR RLC devices to receive a segment that is stored in a buffer or is to be received later, may reconstruct the segment into one whole RLC PDU, and may deliver the RLC PDU to the PDCP devices. The NR RLC layers may not include a concatenation function, and the concatenation function may be performed in the NR MAC layers or may be replaced with a multiplexing function of the NR MAC layers.

The out-of-sequence delivery function of the NR RLC devices refers to a function of delivering RLC SDUs received from a lower layer directly to a higher layer regardless of order, and may include a function of reassembling and delivering a plurality of RLC SDUs when one original RLC SDU is divided into the plurality of RLC SDUs to be received. In addition, the out-of-sequence delivery function may include a function of recording lost RLC PDUs by storing and reordering the RLC SNs or PDCP SNs of received RLC PDUs.

The NR MACs 9-40 and 9-55 may be connected to a plurality of NR RLC-layer devices configured in one device, and main functions of the NR MACs may include at least some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding NR PHY layers 9-45 and 9-50 may perform channel coding and modulation of higher-layer data and convert the data into OFDM symbols to transmit the OFDM symbols via a wireless channel, or demodulate OFDM symbols received via a wireless channel and perform channel decoding of the OFDM symbols to deliver the OFDM symbols to a higher layer.

Details of the wireless protocol structures may be changed variously according to a carrier (or cell) operating method. For example, when the base station transmits data to the UE on the basis of a single carrier (or cell), the base station and the UE use a protocol structure having each layer with a single structure as in 9-00. When the base station transmits data to the UE on the basis of carrier aggregation (CA) using multiple carriers at a single TRP, the base station and the UE use a protocol structure in which up to an RLC has a single structure but PHY layers are multiplexed through an MAC layer as in 9-10. In another example, when the base station transmits data to the UE on the basis of connectivity (DC) using multiple carriers at a plurality of TRPs, the base station and the UE use a protocol structure in which up to an RLC has a single structure but PHY layers are multiplexed through MAC layers as in 9-20.

In LTE and NR, a UE has a procedure of reporting a capability supported by the UE to a serving base station in a state of being connected to the base station. In the following description, this procedure is referred to as UE capability reporting. The base station may transmit a UE capability enquiry message for requesting a capability report to the UE in the connected state. The base station may include a UE capability request for each RAT type in this message. The request for each RAT type may include requested frequency band information.

Further, the UE capability enquiry message may request a plurality of RAT types in one RRC message container. According to another example, the UE capability enquiry message including the request for each RAT type may be transmitted to the UE a plurality of times. That is, a UE capability enquiry is repeated a plurality of times, and the UE may configure a UE capability information message in response to the enquiry and may report the message a plurality of times. In an NR system, a UE capability for MR-DC including NR, LTE, and EN-DC is requested. Generally, the UE capability enquiry message is initially transmitted after the UE is connected, but the base station may request a capability report from the UE under any condition when needed.

Upon receiving a UE capability report request from the base station, the UE may configure a UE capability according to an RAT type requested from the base station and band information. Hereinafter, a method for a UE to configure a UE capability in the NR system will be described.

1. When the UE is provided with a list of LTE and/or NR bands through a UE capability request from the base station, the UE may configure a band combination (BC) for EN-DC and NR standalone (SA). That is, the UE may configure a BC candidate list for EN-DC and NR SA, based on bands requested from the base station via FreqBandList. The bands may have priorities in an order described in the FreqBandList.
2. When the base station requests a UE capability report by setting a "eutra-nr-only" flag or "eutra" flag, the UE may completely remove the NR SA BCs from the configured BC candidate list. This operation may occur only when an LTE base station (eNB) requests a "eutra" capability.
3. The UE removes fallback BCs from the BC candidate list configured in the above operation. A fallback BC corresponds to a super set BC from which a band corresponding to at least one SCell is removed, and can be omitted since the super set BC can already cover the fallback BC. This operation also applies to MR-DC, that is, to LTE bands. BCs remaining after this operation are a final "candidate BC list".

4. The UE may select BCs to be reported by selecting BCs corresponding to a requested RAT type from the final "candidate BC list". In this operation, the UE configures a supportedBandCombinationList in a predetermined order. That is, the UE may configure a BC to be reported and a UE capability according to a preset rat-Type order (nr->eutra-nr->eutra). In addition, the UE configures a featureSetCombination for the configured supportedBandCombinationList and configures a list of a "candidate feature set combination" from the candidate BC list from which a list of the fallback BCs (including a capability in the same or lower level) is removed. The "candidate feature set combination" includes feature set combinations for both NR and EUTRA-NR BC, and may be obtained from a feature set combination of UE-NR-Capabilities and UE-MRDC-Capabilities containers.

5. When a requested rat Type is eutra-nr and is influential, featureSetCombinations is included in both containers of UE-MRDC-Capabilities and UE-NR-Capabilities. However, an NR feature set is included only in UE-NR-Capabilities.

After the UE capability is configured, the UE transmits a UE capability information message including the UE capability to the base station. The base station may perform scheduling and transmission/reception management appropriate for the UE, based on the UE capability received from the UE.

Figure 10:
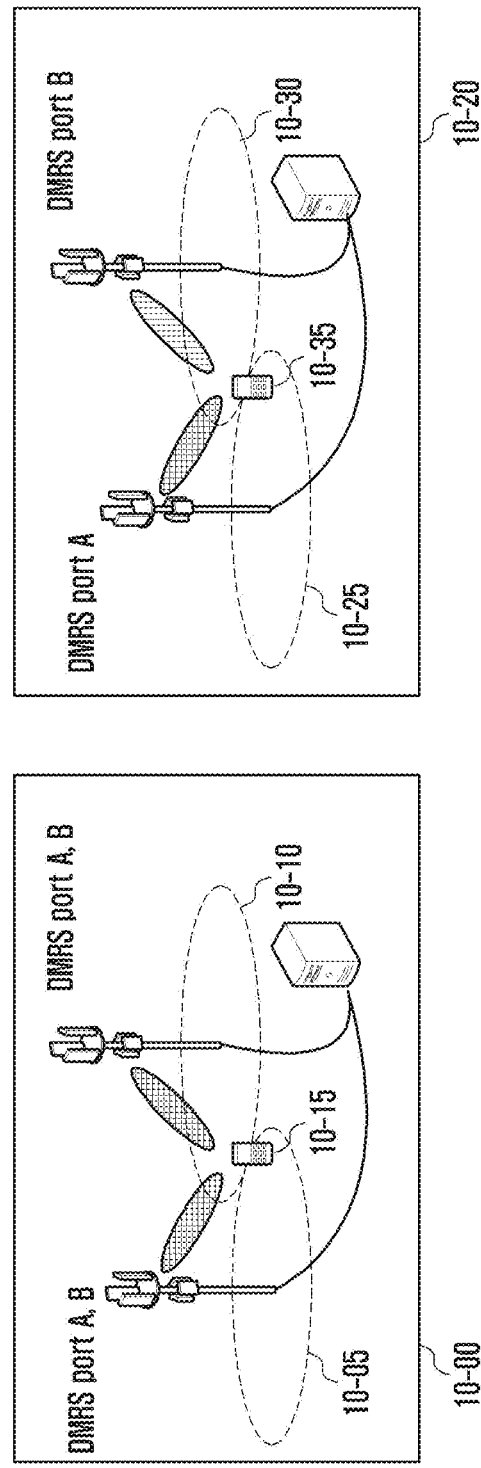
FIG. 10 illustrates a cooperative communication antenna port configuration according to an embodiment of the disclosure.

FIG. 10 illustrates a cooperative communication antenna port configuration according to an embodiment.

FIG. 10 shows an example of radio resource allocation per transmission reception point (TRP) according to a joint transmission (JT) technique and a situation. In FIG. 10, 10-00 illustrates coherent joint transmission (C-JT) supporting coherent precoding between individual cells, TRPs, and/or beams. In C-JT, TRP A 10-05 and TRP B 10-10 transmit the same data (PDSCH), and a plurality of TRPs may perform joint precoding, which may mean that TRP A 10-05 and TRP B 10-10 transmit the same DMRS ports (e.g., both TRPs transmit DMRS ports A and B) for receiving the same PDSCH. In this case, the UE 10-15 may receive one piece of DCI for receiving one PDSCH demodulated by DMRS ports A and B.

In FIG. 10, 10-20 illustrates non-coherent joint transmission (NC-JT) supporting non-coherent precoding between individual cells, TRPs, and/or beams. In NC-JT, the individual cells, TRPs, and/or beams transmit different PDSCHs, and thus individual precoding may be applied to each data (or PDSCH), which may mean that TRP A 10-25 and TRP B 10-30 transmit different DMRS ports (e.g., TRP A transmits DMRS port A and TRP B transmits DMRS port B) for receiving the different PDSCHs. In this case, the UE receives two types of DCI for receiving PDSCH A demodulated by DMRS port A and PDSCH B demodulated by DMRS port B.

To support NC-JT in which two or more transmission points simultaneously provide data to one UE, it is necessary to allocate PDSCHs transmitted from two (or more) different transmission points through a single PDCCH, or to allocate PDSCHs transmitted from two or more different transmission points through a plurality of PDCCHs. The UE may obtain a quasi co-location (QCL) relationship between reference signals or channels, based on L1/L2/L3 signaling and may efficiently estimate large scale parameters of the reference signals or channels through the QCL relationship. When a transmission point of a certain reference signal or channel is different, the large scale parameters are difficult to share, and thus the base station needs to simultaneously notify the UE of pieces of quasi co-location information about two or more transmission points through two or more TCI states when performing cooperative transmission.

When non-coherent cooperative transmission is supported through a plurality of PDCCHs, that is, when two or more PDCCHs allocate two or more PDSCHs to the same serving cell and the same BWP at the same time, two or more TCI states may be allocated to the respective PDSCHs or DMRS ports through the respective PDCCHs. However, when non-coherent cooperative transmission is supported through a single PDCCH, that is, when one PDCCH allocates two or more PDSCHs to the same serving cell and the same BWP at the same time, the two or more TCI states may be allocated to the respective PDSCHs or DMRS ports through the single PDCCH.

Assuming that DMRS ports allocated to a UE at a specific time are divided into a DMRS port group A transmitted from a transmission point A and a DMRS port group B transmitted from a transmission point B, two or more TCI states are connected to the respective DMRS port groups, and a channel may be estimated based on different QCL assumptions for the respective groups. The different DMRS ports may be subjected to code division multiplexing (CDM), frequency division multiplexing (FDM), or time domain multiplexing (TDM) in order to increase channel measurement accuracy and to reduce transmission load. Here, when DMRS ports subjected to CDM are collectively referred to as a CDM group, since code-based multiplexing operates properly when the DMRS ports in the CDM group have similar channel characteristics (that is, the ports are easily distinguished by an orthogonal cover code (OCC) when the ports have similar channel characteristics), it may be important to ensure that the DMRS ports in the same CDM group do not have different TCI states.

Hereinafter, for convenience of description, Table X to Table Y are referred to as a "first antenna port indication (or conventional antenna port indication)", and a table in which some or all of code points in Table X to Table Y are modified are referred to as a "second antenna port indication (new antenna port indication)". Further, DMRS port and CDM group allocation is referred to as DMRS allocation.

The UE may determine the number of antenna ports used for PDSCH transmission through a table indicating a DMRS port. In DCI Format 1_1, a Rel-15-based antenna port indication method is determined based on an index with a length of four to six bits indicated by an antenna port field in DCI. The UE may identify information about the number and indexes of DMRS ports for a PDSCH, the number of front-load symbols, and the number of CDM groups, based on an indicator (index) transmitted by the base station. In addition, the UE may determine a dynamic change in beamforming direction, based on information in a transmission configuration indication (TCI) field in DCI 1_1. When tci-PresentDCl is configured to 'enabled' in a higher layer, the UE may identify the TCI field of the three-bit information, thereby determining TCI states activated for a DL BWP or a scheduled component carrier and the direction of a beam associated with a DL-RS. When tci-PresentDCl is disabled, the UE may consider that there is no change in the direction of a beam in beamforming.

In various embodiments of the disclosure, a scenario of allocating PDSCHs transmitted from two (or more) different transmission points through a plurality of PDCCHs or a single PDCCH is considered. A Rel-15 UE may receive a PDSCH stream including a single layer or a plurality of layers subjected to QCL, based on TCI information and antenna port information in a single PDCCH. However, a Rel-16 UE may receive data transmitted from a multi-TRP or a plurality of base stations in a C-JT/NC-JT format. To support C-JT/NC-JT, the Rel-16 UE needs basic higher-layer configuration. Specifically, the UE may receive a parameter or setting value related to C-JT/NC-JT through a higher layer and may perform configuration to support C-JT/NC-JT, based on the received parameter or setting value.

A UE may support data transmitted from a multi-TRP or a plurality of base stations in the C-JT/NC-JT format. The UE supporting C-JT/NC-JT may receive a parameter or setting value related to C-JT/NC-JT in higher-layer configuration and may set an RRC parameter of the UE, based on the parameter or setting value. For the higher-layer configuration, the UE may utilize a UE capability parameter tci-StatePDSCH. The UE capability parameter tci-StatePDSCH defines TCI states for PDSCH transmission, and the number of TCI states may be configured to 4, 8, 16, 32, 64, and 128 in FR1 and may be configured to 64 and 128 in FR2. Among the configured numbers, up to eight states that can be indicated by three bits of a TCI field of DCI through a MAC CE message may be configured. A maximum value of 128 refers to a value indicated by maxNumberConfiguredTCl-statesPerCC in the tci-StatePDSCH parameter included in capability signaling of the UE. This series of configuration processes from the higher-layer configuration to MAC CE configuration may be applied to a beamforming indication or a beamforming change command for at least one PDSCH in one TRP.

According to embodiments of the disclosure, a base station may instruct the UE to activate/deactivate a specific TCI state through at least one MAC CE signaling. In particular, as in DCI format 1_1, when allocating a PDSCH for a specific UE, the base station enables the UE to dynamically support a QCL change command including a (reception) beamforming direction indication or beamforming direction information using the TCI field.

The QCL change command refers to an operation applied when the UE identifying TCI states field information in DCI format 1_1 receives the PDSCH in a downlink after a certain time (e.g., after a specified threshold indicated by a UE capability report or signaling, such as timeDurationForQCL, from the time when receiving the DCI), and the direction refers to a corresponding beamforming configuration direction in connection a DL RS of a base station/TRP subjected to QCL.

A Rel-16 MAC CE may be configured in a form of partially extending a Rel-15 MAC CE message. This embodiment may propose including all TCI states activated by a Rel-15 MAC CE in TCI states activated by a Rel-16 MAC CE.

Figure 11:
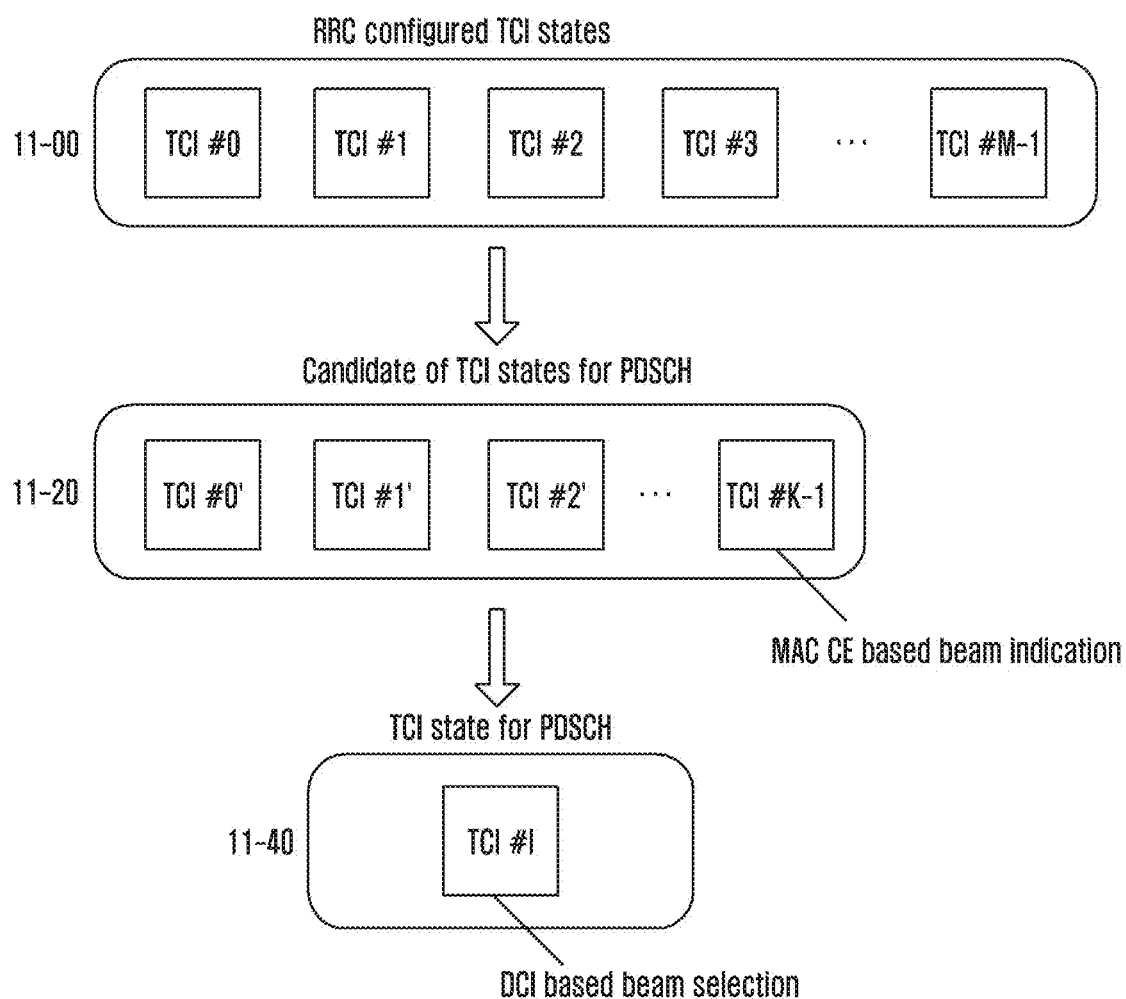
FIG. 11 illustrates an example of configuring and indicating TCI states according to an embodiment of the disclosure.

In one example, as shown in FIG. 11, the base station may determine a total of M TCI states of Rel-15 RRC configured TCI states 11-00, such as TCI #0, TCI #1, TCI #2, . . . , TCI #M-1, and may select TCI #0', TCI #1', TCI #2', . . . , TCI #K-1 as a subset 11-20 of TCI states selected by a Rel-15 MAC CE therefrom. However, a base station and a UE supporting Rel-16 may separately configure RRC configured TCI states supporting Rel-16 or may use the RRC configured TCI states configured in Rel-15 as they are. Here, the RRC configured TCI states supporting Rel-16 may include some or all of the RRC configured TCI states configured in Rel-15. When M=128, the number of TCI states of Rel-16 may be equal to or greater than 128. When the base station or UE extends the number of TCI states supported by Rel-15 in proportion to the number of base stations/TRPs operating according to C-JT/NC-JT in Rel-16, if two TRPs operate, up to 256 TCI states may be configured. Here, the Rel-16 MAC CE may include some or all of the TCI states supported by the Rel-15 MAC CE among the RRC configured TCI states for Rel-16. Specifically, when the Rel-16 MAC CE includes all of the TCI states supported by the Rel-15 MAC CE and extends the number of the TCI states in proportion to the number of base stations/TRPs operating according to C-JT/NC-JT in Rel-16, if two TRPs operate, up to 2K TCI states may be configured.

Table 13 shows details of a tci-StatePDSCH parameter described in the above embodiment. Specifically, an FR2 mandatory value of a parameter maxNumberConfiguredTClstatesPerCC may be modified from 64 to 128 or 256 or may be separately added as 64, 128, or 256 for C-JT/NC-JT.

TABLE 13

| Definitions for parameters | Per | M | FDD-TDD DIFF | FR1-FR2 DIFF |
|---|---|---|---|---|
| tci-StatePDSCH<br>Defines support of TCI-States for PDSCH. The capability<br>signalling comprises the following parameters:<br>- maxNumberConfiguredTCIstatesPerCC indicates<br>  the maximum number of configured TCI-states<br>  per CC for PDSCH. For FR2, the UE is mandated<br>  to set the value to 64 128. For<br>  FR1, the UE is mandated to set these values<br>  to the maximum number of allowed SSBs in the<br>  supported band;<br>- maxNumberActiveTCI-PerBWP indicates the maximum<br>  number of activated TCI-states per BWP per CC,<br>  including control and data. If a UE reports X<br>  active TCI state(s), it is not expected that<br>  more than X active QCL type D assumption(s)<br>  for any PDSCH and any CORESETs for a given<br>  BWP of a serving cell become active for the UE. | Band | Yes | No | No |

Note the UE is required to track only the active TCI states.

In another example, a base station or UE supporting Rel-15 and Rel-16 may configure a maximum value for each of Rel-15 and Rel-16 to configure TCI states through a MAC CE and may configure the number of TCI states to a value less than or equal to the configured maximum value. Various embodiments may be proposed below as methods for configuring the number of TCI states to the value less than or equal to the maximum value.

The number of TCI states activated by Rel-15 and Rel-16 MAC CE messages may be configured based on a UE capability value reported by the UE. According to another example, the number of TCI states activated by the Rel-15 and Rel-16 MAC CE messages may be determined as a value preset by the base station. According to still another example, the number of TCI states activated by the Rel-15 and Rel-16 MAC CE messages may be determined as a value previously agreed between the base station and the UE.

For example, as shown in FIG. 11, the base station and the UE may determine a total of M TCI states 11-00 of Rel-15 RRC configured TCI states, such as TCI #0, TCI #1, TCI #2, . . . , TCI #M-1, and may select a subset 11-20 of TCI states selected by a Rel-15 MAC CE therefrom, thereby arranging TCI #0', TCI #1', TCI #2', . . . , TCI #K-1. When TCI #0 is selected from among the M TCI states, TCI #0 may be arranged in TCI #0'. Here, for example, the maximum value of K for the base station and the UE supporting Rel-15 may be configured or determined to be 8, and the maximum value of K for the base station and the UE supporting Rel-16 may also be configured to 8. When the maximum value is configured to 8, the base station may instruct the UE to select a beam for a PDSCH through a DCI-based beam selection operation in one CORESET. Selection of a beam may be determined by identifying TCI field information 11-40 in DCI among up to eight pieces. TCI field #I indicated in FIG. 11 may be selected as a value of 0 to 7. For example, when a TCI field in the DCI is indicated as 000, it may be determined that TCI #0' (TCI #I=TCI #0') is indicated among TCI #0', TCI #1', TCI #2', TCI #3', TCI #4', TCI #5', TCI #6', and TCI #7. Although this embodiment shows that each maximum value is configure to 8 (K=8), the maximum value may be configured to a value less than 8 Although this embodiment shows that the maximum value K of the MAC CE for Rel-15 and the maximum value K of the MAC CE for Rel-16 are the same, the maximum values may be configured to different values.

In another example, when the number of TCI states is extended in proportion to the number of base stations/TRPs operating in C-JT/NC-JT, if two TRPs operate, the maximum value of K for the base station and the UE supporting Rel-16 may be configured to 16. When the maximum value is configured to 16, the base station may instruct the UE to select one beam or two or more beams for a PDSCH through a DCI-based beam selection operation in one CORESET. When K is 16, #I selected and indicated by the base station may be selected as a value of 0 to 15. Although this embodiment shows that the maximum value is configured to 16 (K=16), the maximum value may be configured to a value less than 16.

In still another example, it may be determined that the base station or the UE uses only Rel-16 MAC CE signaling. That is, the Rel-15 MAC CE and the Rel-16 MAC CE may use one Rel-16 MAC CE integrated for C-JT/NC-JT.

For example, when the UE is scheduled by DCI based on Rel-15, if a TCI code point in the DCI is associated with two or more TCI states, the UE may consider only a first TCI state among the plurality of TCI states. When the Rel-15 UE and the Rel-16 UE are subjected to signaling by a MAC CE in an integrated or compatible format, the Rel-15 UE may operate similarly to receiving the Rel-15 MAC CE defined in the current standard and obtaining desired information. However, the Rel-16 UE may determine that at least one TCI state is selected from among a plurality of TCI states selected from DCI according to determination of transmission of the base station. A transmission determination method of the base station may be determined by the UE, based on at least one of information on the number of antenna ports in the DCI, DMRS port information indicated in a DMRS table, and TCI index information.

Figure 12:
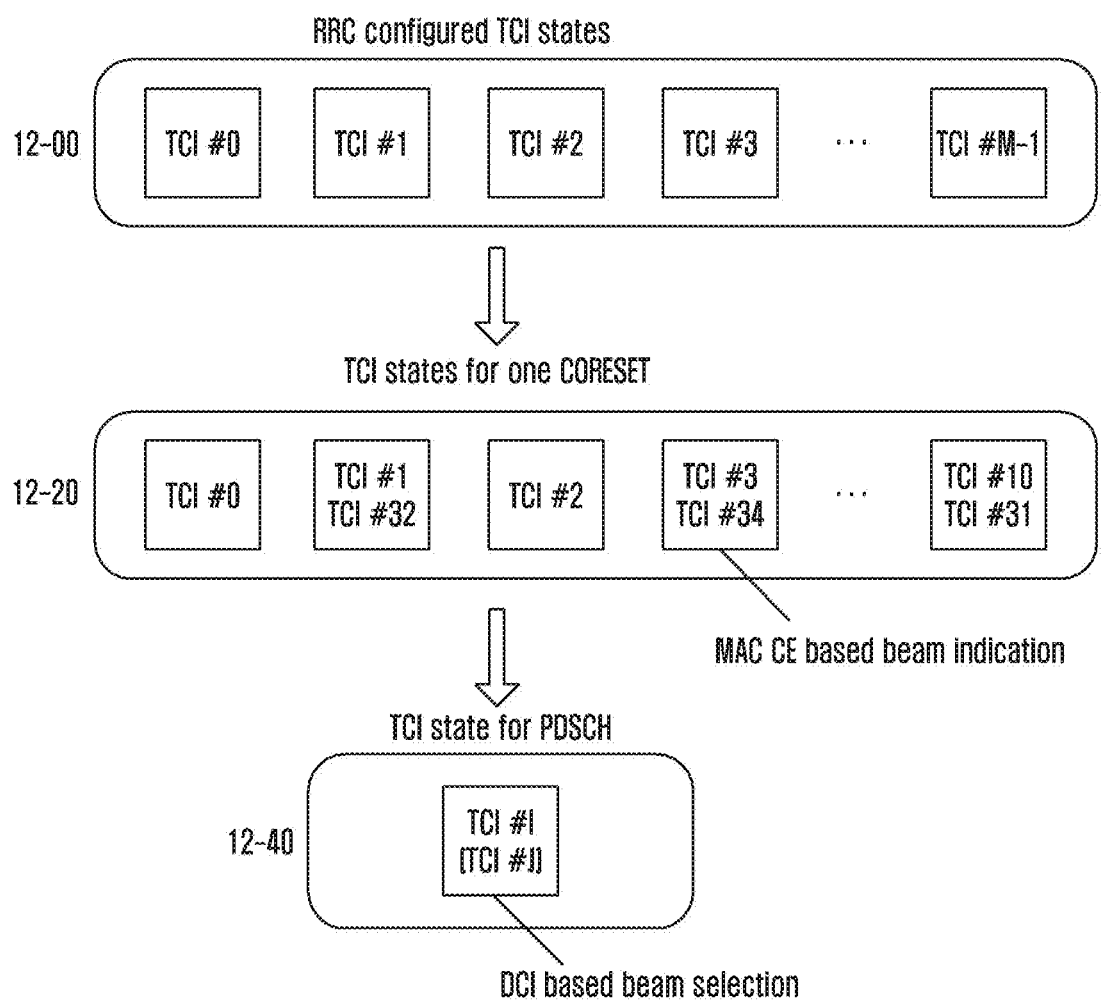
FIG. 12 illustrates an example of configuring and indicating TCI states according to another embodiment of the disclosure.

For example, as shown in FIG. 12, the base station may determine a total of M TCI states 12-00 of Rel-15 RRC configured TCI states, such as TCI #0, TCI #1, TCI #2, . . . , TCI #M-1, among which one set of TCI state or at least one set of TCI states for C-JT/NC-JT may be configured by a MAC CE (12-20). The MAC CE set may be complexly configured to include one piece of TCI state information and to include at least two pieces of TCI state information for C-JT/NC-JT. For example, in this configuration, according to a listing order in which a set including one TCI state is disposed first and a set including two TCI states is subsequently disposed, a set including a greater number of TCI states may be subsequently disposed. In another example, TCI states may be disposed according to a listing order in which a TCI state with a smaller TCI state index is disposed in front, such as TCI #0, (TCI #1, TCI #32), TCI #2, (TCI #3, TCI #34), . . . , (TCI #10, TCI #31). Upon receiving the MAC CE, one of TCI #I or (TCI #I, TCI #J) may be indicated (12-40) to the UE, based on DCI-based beam selection information in DCI. In this embodiment, when TCI #I is indicated, the UE may determine that one beamforming direction is selected. Specifically, when TCI #0 is indicated, the UE may perform beamforming in the direction of a beam mapped to TCI #0. Further, in the embodiment, when (TCI #I, TCI #J) is indicated, the Rel-15 UE may determine that TCI #I, which is a first index, is selected among two beamforming directions. Specifically, when (TCI #1, TCI #32) is indicated, the UE may perform beamforming in the direction of a beam mapped to TCI #1 in a first TRP. Further, in the embodiment, when (TCI #I, TCI #J) is indicated, the Rel-16 UE may determine that two beamforming directions are selected. Specifically, when (TCI #1, TCI #32) is indicated, the UE may perform beamforming in the direction of a beam mapped to TCI #1 in a first TRP and may perform beamforming in the direction of a beam mapped to TCI #32 in a second TRP.

That is, when the UE is a Rel-15 UE, the UE may interpret only TCI #I, which is first TCI state information, among information obtained from the MAC CE and may determine single transmission performed by one TRP. However, when the UE is a Rel-16 UE, the UE may interpret at least some or all of the MAC CE information obtained by indexing. When two TRPs for C-JT/NC-JT are configured for the UE, the UE may interpret all TCI state information, which is (TCI #I, TCI #J), and may determine that two beams are selected. In this embodiment, when three TRPs for C-JT/NC-JT are configured for the UE, a TCI state, such as (TCI #I, TCI #J, TCI #L), may be additionally included in the MAC CE.

When the UE is scheduled by the DCI based on Rel-15, if the TCI code point in the DCI is associated with two or more TCI states, the UE may consider only a smallest TCI state ID among the plurality of TCI states.

For example, as shown in FIG. 12, the base station may determine a total of M TCI states 12-00 of Rel-15 RRC configured TCI states, such as TCI #0, TCI #1, TCI #2, . . . , TCI #M-1, among which one set of TCI state or at least one set of TCI states for C-JT/NC-JT may be configured by a MAC CE (12-20). The MAC CE set may be complexly configured to include one piece of TCI state information and to include at least two pieces of TCI state information for C-JT/NC-JT. For example, in this configuration, according to a listing order in which a set including one TCI state is disposed first and a set including two TCI states is subsequently disposed, a set including a greater number of TCI states may be subsequently disposed. In another example, in the foregoing configuration, TCI states may be disposed such that a TCI state with a smaller TCI state index is disposed in front, based on the minimum value among TCI state indexes, such as TCI #0, (TCI #32, TCI #1), TCI #2, (TCI #34, TCI #3), . . . , (TCI #10, TCI #31). Upon receiving the MAC CE, one of TCI #I or (TCI #I, TCI #J) may be indicated (12-40) to the UE, based on DCI-based beam selection information in DCI.

In this embodiment, when TCI #I is indicated, the UE may determine that one beamforming direction is selected. Specifically, when TCI #0 is indicated, the UE may perform beamforming in the direction of a beam mapped to TCI #0. Further, in the embodiment, when (TCI #I, TCI #J) is indicated, the Rel-15 UE may determine TCI #I (I<J) is selected among two beamforming directions considering the smallest TCI state ID. Specifically, when (TCI #32, TCI #1) is indicated, the UE may perform beamforming in the direction of a beam mapped to TCI #1 in a first TRP. Further, in the embodiment, when (TCI #I, TCI #J) is indicated, the Rel-16 UE may determine that two beamforming directions are selected. Specifically, when (TCI #32, TCI #1) is indicated, the UE may perform beamforming in the direction of a beam mapped to TCI #1 in a first TRP and may perform beamforming in the direction of a beam mapped to TCI #32 in a second TRP. In this embodiment, when three TRPs for C-JT/NC-JT are configured for the UE, a TCI state, such as (TCI #I, TCI #J, TCI #L), may be additionally included in the MAC CE.

FIG. 13 illustrates the structure of a MAC CE message for indicating a TCI state. FIG. 13 illustrates the structure of a MAC CE message transmitted to indicate K TCI states to a UE when a base station selects the K TCI states 11-20 from the M TCI states 11-00 in FIG. 11. The MAC CE message may basically include information about a serving cell ID (e.g., five bits) and a BWP ID (e.g., two bits) configured for communication between the base station and the UE. Further, the MAC CE message requires M bits to respectively indicate whether the M TCI states are activated using a one-bit indication. The M bits may be aligned using a resource in an octet form as shown in FIG. 13. Indexes T0, T1, . . . , T(N−2)×8−7 respectively denote the TCI states, and M is configured to be a value equal to or greater than T(N−2)×8 and less than or equal to T(N−2)×8−7 in order to indicate a total of M bits. For example, to indicate activated TCI states among 128 TCI states, the MAC CE message requires a total of 17-octet (N=17) resources including the configured serving cell ID and BWP ID (Oct 1). Here, when eight TCI states from T0 to T7 are activated, T0 to T7 resource positions in the MAC CE message are indicated by '1', and the remaining T8 to T127 are indicated by '0'. The resource positions indicated by '1' to indicate the activation of the TCI states are mapped to determine the direction of the activated beamforming when the UE receiving the MAC CE succeeds in decoding.

Figure 14:
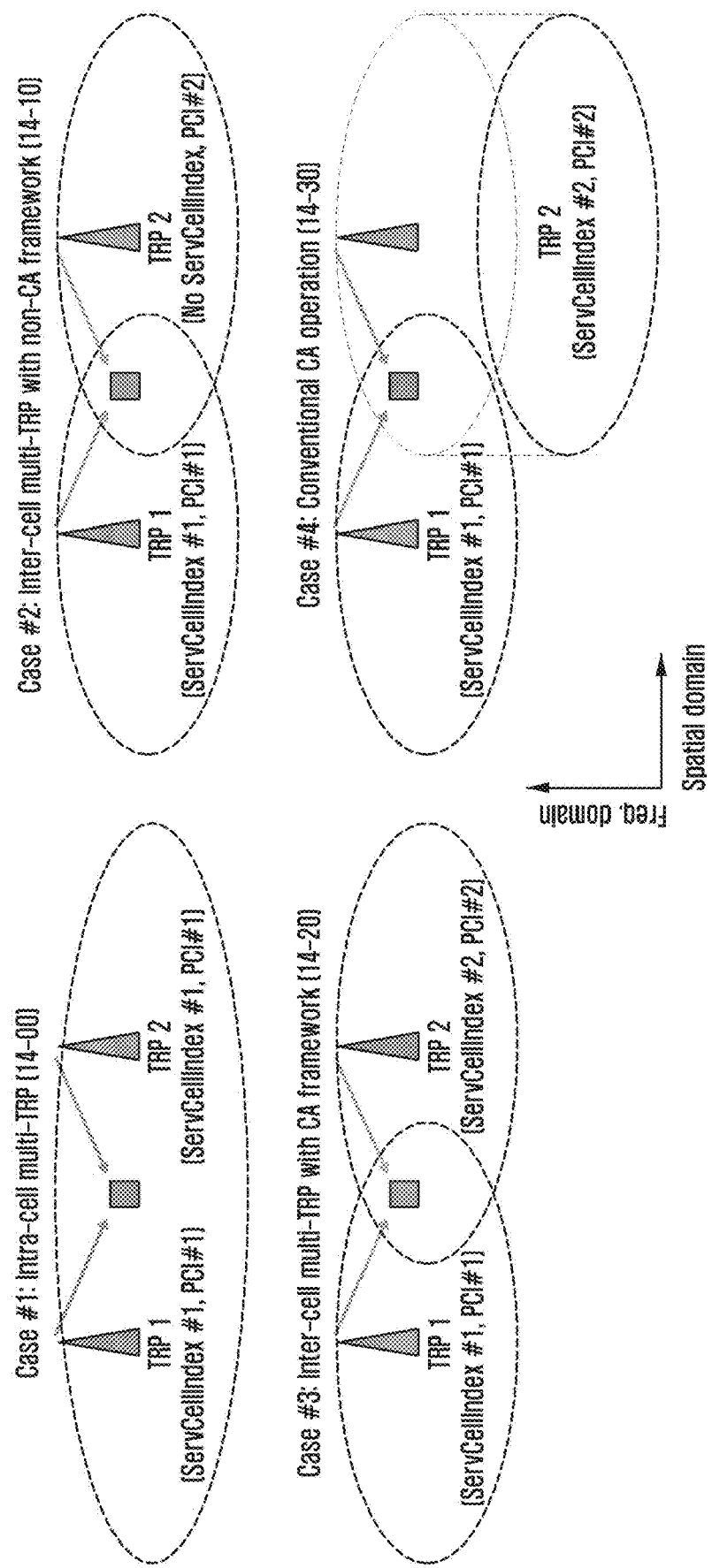
FIG. 14 illustrates an example of configuring a serving cell and a cell identifier per TRP according to an embodiment of the disclosure.

FIG. 14 illustrates various examples of a multi-TRP operation according to an embodiment.

Case #4 14-30 of FIG. 14 illustrates an example of configuring a serving cell and a physical cell identity (PCI) according to a conventional CA operation, which is a criterion for indicating the difference between multi-TRP operation methods. Referring to Case #4, in a general CA situation in which individual cells occupy different frequency resources, a base station may configure different serving cells (ServCellConfigCommon) for the individual cells (i.e., frequency band values FrequencyInfoDL indicated by DownlinkConfigCommon in individual serving cell configurations are different), and accordingly different indexes (ServCellIndex) may be configured and different PCI values may be mapped for the individual cells. Here, parameters in ServCellConfigCommon are as shown in the following Table.

| | |
|---|---|
| ServingCellConfigCommon ::= | SEQUENCE { |
| physCellId | (PCI allocated to serving cell) |
| downlinkConfigCommon configuration value) | (Downlink common |
| uplinkConfigCommon value) | (Uplink common configuration |
| supplementaryUplinkConfig | (SUL configuration value) |
| n-TimingAdvanceOffset value) | (UL timing advance configuration |
| ssb-PositionsInBurst position configuration value) | CHOICE { (SSB transmission |
| shortBitmap | BIT STRING (SIZE (4)), |
| mediumBitmap | BIT STRING (SIZE (8)), |
| longBitmap | BIT STRING (SIZE (64)) |
| } | |
| ssb-periodicityServingCell configuration value) | (SSB periodicity position |
| dmrs-TypeA-Position configuration value) | (PDSCH DMRS position |
| lte-CRS-ToMatchAround configuration value) | (LTE CRS rate matching |
| rateMatchPatternToAddModList configuration value) | (NR rate matching |
| rateMatchPatternToReleaseList value) | (NR rate matching configuration |
| ssbSubcarrierSpacing configuration value) | (SSB subcarrier spacing |

| tdd-UL-DL-ConfigurationCommon | (TDD-UL-DL-ConfigCommon) |
| ss-PBCH-BlockPower configuration value) | (SSB transmission power |
| ... | |
| } | |

Case #1 14-00 of FIG. 14 illustrates an intra-cell multi-TRP operation in which one or more TRPs operate within one serving cell configuration. Referring to Case #1, since the base station configures channels and signals transmitted from different TRPs to be included in one serving cell configuration, the plurality of TRPs operate based on one ServCellIndex (ServCellIndex #1), and since there is only one ServCellIndex, only one PCI is used. In this case, when a plurality of SSBs is transmitted from TRP 1 and TRP 2, the SSBs have the same PCI value, and there is no problem in mapping the ServCellIndex value indicated by a cell parameter in the QCL-Info to the PCI and designating an SSB transmitted from either TRP 1 or TRP 2 as a reference antenna port.

Case #3 14-20 of FIG. 14 illustrates an inter-cell multi-TRP operation in which one or more TRPs have different PCIs. In case #3, the base station configures channels and signals transmitted from different TRPs to be included in different serving cell configurations (that is, the respective TRPs have independent serving cell configurations, and frequency band values FrequencyInfoDL indicated by DownlinkConfigCommon in the serving cell configurations indicate at least partly overlapping bands), and since the plurality of TRPs operates based on a plurality of pieces of ServCellIndexe (ServCellIndex #1 and ServCellIndex #2) included in the serving cell configurations, a separate PCI can be used for each TRP (i.e. one PCI can be allocated per ServCellIndex). When a plurality of SSBs is transmitted from TRP 1 and TRP 2, the SSBs may have different PCI values (PCI #1 or PCI #2), and in case #3, there is no problem in mapping a PCI value suitable for each TRP by properly selecting ServCellIndex values (ServceCellIndex #1 and ServCellIndex #2) indicated by a cell parameter in QCL-Info included in the different serving cell configurations and designating an SSB transmitted from either TRP 1 or TRP 2 as a reference antenna port. However, since this configuration uses one serving cell configuration, which can be used for CA of the UE, for a multi-TRP, the degree of freedom of CA configuration may be limited or signaling load may be increased.

Case #2 14-10 of FIG. 14 illustrates another example of an inter-cell multi-TRP operation in which one or more TRPs have different PCIs. Referring to Case #2, the base station may configure channels and signals transmitted from different TRPs to be included in one serving cell configuration (in consideration of the signaling load according to application of case #3). In this case, the UE operates based on ServCellIndex (ServCellIndex #1) included in the one serving cell configuration and may thus not recognize a PCI (PCI #2) allocated to a second TRP. When a plurality of SSBs is transmitted from TRP 1 and TRP 2, the SSBs may have different PCI values PCI #1 or PCI #2), and in case #2, the PCI value (PCI #2) of the second TRP may not be mapped through the ServCellIndex value indicated by a cell parameter in QCL-Info included in the one serving cell configuration. Therefore, in the inter-cell multi-TRP operation according to case #2 14-10, it is only possible to designate an SSB transmitted from TRP 1 as a reference antenna port, and it may be impossible to designate an SSB transmitted from TRP 2 as a reference antenna port.

The following embodiments of the disclosure provide methods for indicating/configuring a QCL reference antenna port to support case #2 14-10, that is, the inter-cell multi-TRP operation using a single serving cell configuration within a certain frequency resource (inter-cell multi-TRP with a non-CA framework).

It is possible for the base station to explicitly indicate or implicitly indicate to the UE that the inter-cell multi-TRP with the non-CA framework is applied through various methods.

For example, the base station may notify the UE that the inter-cell multi-TRP with the non-CA framework is applied through higher-layer signaling, such as by "configuring a parameter (higher-layer parameter per CORESET) that divides a CORESET configured in one serving cell or BWP into two or more groups (CORESET groups)", by "configuring a parameter (higher-layer parameter per PUCCH) that divides a PUCCH resource configured in one serving cell or BWP into two or more groups (PUCCH groups)", or by defining and configuring an independent higher-layer parameter.

In another example, when a certain serving cell is configured to perform a multi-TRP operation (i.e., when it is configured to receive one or more PDSCHs at a time in one BWP within the certain serving cell), if a frequency resource of the serving cell (i.e., a frequency resource indicated by a frequency band value FrequencyInfoDL indicated by DownlinkConfigCommon of a corresponding serving cell configuration) does not overlap any frequency configuration of other serving cell configurations, the UE may understand that an inter-cell multi-TRP with a non-CA framework is applied.

Although omitted in order not to obscure the gist of a description in the following embodiments, it should be noted that one of methods in the following embodiments can be applied assuming that the UE recognizes that the base station performs an inter-cell multi-TRP operation with a non-CA framework using one of the above examples or applications thereof.

First Embodiment: Method of Adding PCI Value to TCI Configuration or QCL Configuration A first embodiment provides a method of configuring an SSB based on an additional PCI as a QCL reference antenna port by adding a parameter for connecting additional PCI values in addition to a first PCI value mapped to existing ServCellIndex to a TCI configuration or a QCL configuration included in one serving cell configuration.

Figure 15:
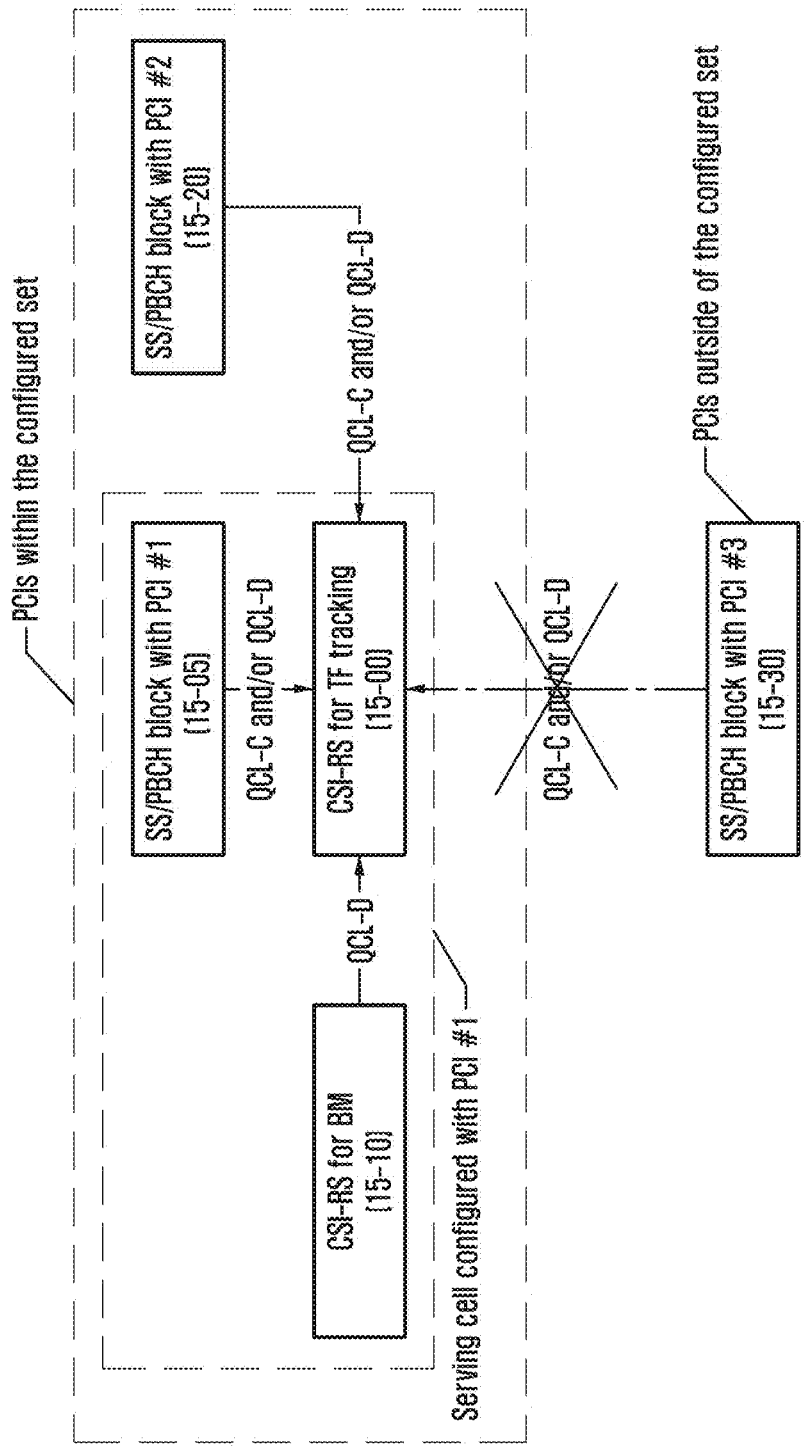
FIG. 15 illustrates an example of a method of configuring and indicating a TCI/QCL for an inter-cell multi-TRP operation according to an embodiment of the disclosure.

FIG. 15 illustrates an example of a method of configuring a QCL target antenna port and a reference antenna port according to an embodiment.

Referring to FIG. 15 and Table 4-1, when a QCL target antenna port is a TRS 15-00, a configurable QCL reference antenna port may be an SSB 15-05 or a CSI-RS for BM 15-10. In an inter-cell multi-TRP environment with a non-CA framework, it may be assumed that the SSB 15-05 or the CSI-RS for BM 15-10 is configured in the same serving cell configuration as the TRS, and PCI #1 is allocated to a corresponding serving cell. Here, as described above, SSBs 15-20 and 15-30 having different PCIs (PCI #2 and PCI #3) cannot be configured as QCL reference antenna ports by conventional signaling.

According to one method for solving the foregoing problem, as illustrated below, it is possible to add a parameter (physCellId) for referring to a PCI other than PCI #1 allocated to the serving cell to a QCL configuration included in one serving cell configuration used in the inter-cell multi-TRP environment with the non-CA framework. For example, to configure the SSB 15-20 associated with PCI #2 as a QCL reference antenna port, the value of physCellId added to the following QCL configuration may be set to PCI #2.

```
    QCL-Info ::=        SEQUENCE {
    cell                ServCellIndex (Index of serving cell in
which QCL reference RS is transmitted)
    bwp-Id              BWP-Id (Index of BWP in which QCL
reference RS is transmitted)
    referenceSignal     CHOICE { (C Indicator indicating
either CSI-RS or SS/PBCH block as QCL reference RS)
    csi-rs              NZP-CSI-RS-ResourceId,
    ssb                 SSB-Index
    },
    qcl-Type            ENUMERATED {typeA, typeB, typeC,
typeD}, (QCL type indicator)
    physCellId          PhysCellId
    ...
    }
```

According to another method for solving the foregoing problem, as illustrated below, it is possible to add a parameter (physCellId) for referring to a PCI other than PCI #1 allocated to the serving cell to a TCI configuration included in one serving cell configuration used in the inter-cell multi-TRP environment with the non-CA framework. For example, to configure the SSB 15-20 associated with PCI #2 as a QCL reference antenna port, the value of physCellId added to the following TCI configuration may be set to PCI #2.

```
    TCI-State ::=       SEQUENCE {
    tci-StateId         TCI-StateId, (TCI state indicator)
    qcl-Type1           QCL-Info, (First QCL configuration for
target antenna port to which TCI state is applied)
    qcl-Type2           QCL-Info (Second QCL configuration
for target antenna port to which TCI state is applied)
OPTIONAL, -- Need R
    physCellId          PhysCellId
    ...
    }
```

Similarly, to map different PCI values to a first QCL configuration (qcl-Type1) and a second QCL configuration (qcl-Type2) in the TCI configuration, it is possible to add two PCIs (physCellId) and physCellId2) to the TCI configuration as illustrated below.

```
    TCI-State ::=       SEQUENCE {
    tci-StateId         TCI-StateId, (TCI state indicator)
    qcl-Type1           QCL-Info, (first QCL configuration for
target antenna port to which TCI state is applied)
    qcl-Type2           QCL-Info (second QCL configuration for
target antenna port to which TCI state is applied)
OPTIONAL, -- Need R
    physCellId1         PhysCellId
    physCellId2         PhysCellId
    ...
    }
```

In allocating an additional PCI value to the QCL configuration or the TCI configuration, it is possible to consider a specific constraint in view of mobility configuration (or handover configuration) values of the UE.

For example, according to the following table, the base station may configure a series of PCI value lists connected to the SSBs to be measured by the UE through SSB-MTC and SSB-MTC2 configurations.

```
    SSB-MTC ::=                     SEQUENCE {
    periodicityAndOffset            CHOICE {
    sf5                             INTEGER (0..4),
    sf10                            INTEGER (0..9),
    sf20                            INTEGER (0..19),
    sf40                            INTEGER (0..39),
    sf80                            INTEGER (0..79),
    sf160                           INTEGER (0..159)
    },
    duration                        ENUMERATED { sf1, sf2, sf3, sf4, sf5
    }
    }
    SSB-MTC2 ::=                    SEQUENCE {
    pci-List                        SEQUENCE (SIZE
(1..maxNrofPCIsPerSMTC)) OF PhysCellId        OPTIONAL, --
Need M
    periodicity                     ENUMERATED {sf5, sf10, sf20, sf40,
sf80, spare3, spare2, spare1}
    }
```

In the example of FIG. 15, when PCI #2 is included in a pci-list in the SSB-MTC2 but PCI #3 is not included in the pci-list in the SSB-MTC2, the UE is obliged to measure the SSB 15-20 associated with PCI #2 but is not obliged to measure the SSB 15-30 associated with PCI #3. Therefore, the UE can apply configuration of a QCL reference antenna port to the SSB 15-20 associated with PCI #2 but does not expect configuration of a QCL reference antenna port for the SSB 15-30 associated with PCI #3. Here, "the UE does not expect the configuration of the QCL reference antenna port" may be variously applied in actual applications, such as "ignoring configuration details when the configuration is performed", "allowing random processing to be performed since a UE operation for the configuration is not defined", or "guaranteeing that the base station does not perform the configuration".

As another example of the specific constraint, it is possible for the base station to consider a black cell list or a white cell list in a MeasObject configuration. According to the following table, the base station may configure a series of PCI value lists connected to a black list (blackCellsToAddModList) and a white list (whiteCellsToAddModList) of PCI values that the UE considers when measuring an SSB through the MeasObject configuration.

```
    MeasObjectNR ::=                SEQUENCE {
    ssbFrequency                    ARFCN-ValueNR
OPTIONAL, -- Cond SSBorAssociatedSSB
    ssbSubcarrierSpacing            SubcarrierSpacing
OPTIONAL, -- Cond SSBorAssociatedSSB
```

```
    smtc1                    SSB-MTC
OPTIONAL, -- Cond SSBorAssociatedSSB
    smtc2                    SSB-MTC2
OPTIONAL, -- Cond IntraFreqConnected
    refFreqCSI-RS            ARFCN-ValueNR
OPTIONAL, -- Cond CSI-RS
    referenceSignalConfig    ReferenceSignalConfig,
    absThreshSS-BlocksConsolidation  ThresholdNR
OPTIONAL, -- Need R
    absThreshCSI-RS-Consolidation  ThresholdNR
OPTIONAL, -- Need R
    nrofSS-BlocksToAverage   INTEGER (2..maxNrofSS-
BlocksToAverage)             OPTIONAL, -- Need R
    nrofCSI-RS-ResourcesToAverage  INTEGER (2..maxNrofCSI-
RS-ResourcesToAverage)       OPTIONAL, -- Need R
    quantityConfigIndex      INTEGER
(1..maxNrofQuantityConfig),
    offsetMO                 Q-OffsetRangeList,
    cellsToRemoveList        PCI-List
OPTIONAL, -- Need N
    cellsToAddModList        CellsToAddModList
OPTIONAL, -- Need N
    blackCellsToRemoveList   PCI-RangeIndexList
OPTIONAL, -- Need N
    blackCellsToAddModList   SEQUENCE (SIZE
(1..maxNrofPCI-Ranges)) OF PCI-RangeElement  OPTIONAL, -- Need
N
    whiteCellsToRemoveList   PCI-RangeIndexList
OPTIONAL, -- Need N
    whiteCellsToAddModList   SEQUENCE (SIZE
(1..maxNrofPCI-Ranges)) OF PCI-RangeElement  OPTIONAL, -- Need
N
    ... ,
    [[
    freqBandIndicatorNR-v1530  FreqBandIndicatorNR
OPTIONAL, -- Need R
    measCycleSCell-v1530     ENUMERATED {sf160, sf256,
sf320, sf512, sf640, sf1024, sf1280} OPTIONAL -- Need R
    ]]
}
```

In the example of FIG. 15, when PCI #2 is included in the whiteCellsToAddModList in the MeasObjectNR (or is not included in the blackCellsToAddModList) but PCI #3 is not included in the whiteCellsToAddModList in the MeasObjectNR (or is included in the blackCellsToAddModList), the UE is obliged to measure the SSB 15-20 associated with PCI #2 but is not obliged to measure the SSB 15-30 associated with PCI #3. Therefore, the UE can apply configuration of a QCL reference antenna port to the SSB 15-20 associated with PCI #2 but does not expect configuration of a QCL reference antenna port for the SSB 15-30 associated with PCI #3. Here, "the UE does not expect the configuration of the QCL reference antenna port" may be variously applied in actual applications, such as "ignoring configuration details when the configuration is performed", "allowing random processing to be performed since a UE operation for the configuration is not defined", or "guaranteeing that the base station does not perform the configuration".

Second Embodiment: Method of Adding CSI-RS for Mobility to QCL Reference Antenna Port A second embodiment provides a method of referring to a PCI value of a neighboring cell by adding an antenna port (or channel/signal), for which an independent PCI value is configured regardless of a PCI value mapped to ServCellIndex of a certain serving cell, as a new QCL reference antenna port.

Figure 16:
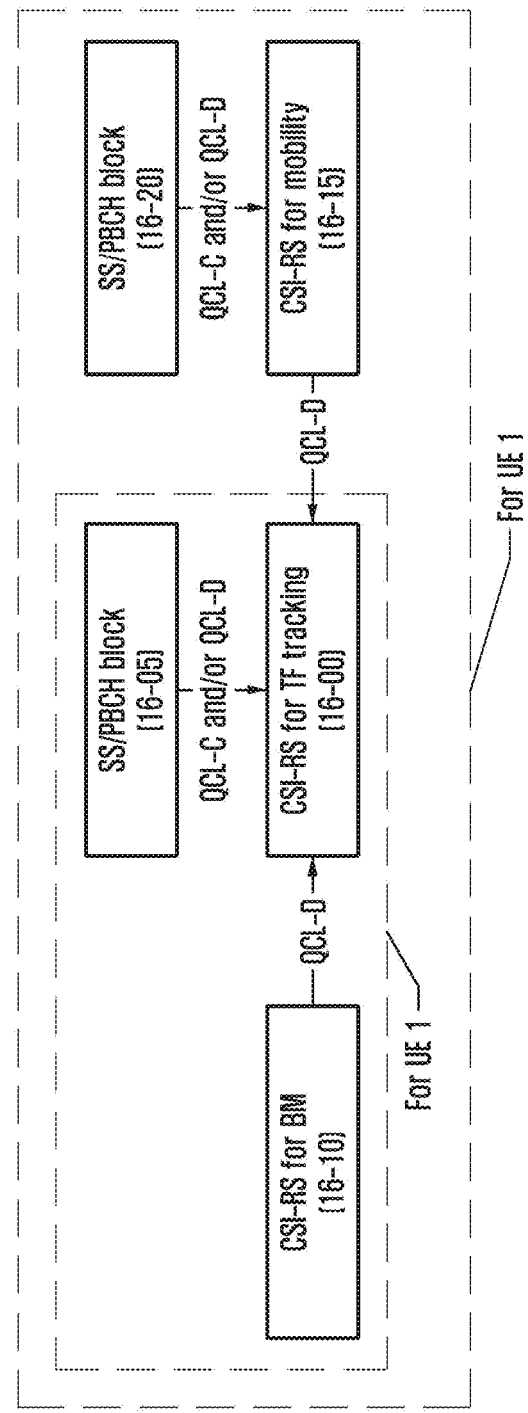
FIG. 16 illustrates another example of a method of configuring and indicating a TCI/QCL for an inter-cell multi-TRP operation according to an embodiment of the disclosure.

FIG. 16 illustrates an example of a method of configuring a QCL target antenna port and a reference antenna port according to an embodiment.

Referring to FIG. 16 and Table 4-1, when a QCL target antenna port is a TRS 16-00, a configurable QCL reference antenna port may be an SSB 16-05 or a CSI-RS for BM 16-10. In an inter-cell multi-TRP environment with a non-CA framework, it may be assumed that the SSB 16-05 or the CSI-RS for BM 16-10 is configured in the same serving cell configuration as the TRS, and PCI #1 is allocated to a corresponding serving cell. Here, as described above, a SSB 15-20 having a different PCI (PCI #2 or PCI #3) cannot be configured as QCL reference antenna ports by conventional signaling.

According to one method for solving the foregoing problem, as illustrated below, it is possible to refer to a PCI other than PCI #1 allocated to the serving cell by adding a CSI-RS for mobility to an antenna port that can be selected through referenceSignal in a QCL configuration.

```
QCL-Info ::=           SEQUENCE {
    cell               ServCellIndex (ndex of serving cell in which
QCL reference RS is transmitted)
    bwp-Id             BWP-Id (Index of BWP in which QCL
reference RS is transmitted)
    referenceSignal    CHOICE { (Indicator indicating either
CSI-RS or SS/PBCH block as QCL reference RS)
    csi-rs             NZP-CSI-RS-ResourceId,
    ssb                SSB-Index
    csi-rs-mobility    CSI-RS-Index (New parameter
for referring to index of CSI-RS-Resource-Mobility)
    },
    qcl-Type           ENUMERATED {typeA, typeB, typeC,
typeD}, (QCL type indicator)
    ...
}
```

In the above table, CSI-RS-Index is a parameter for referring to the index of the following CSI-RS-Resource-Mobility configuration included in the serving cell configuration used in the inter-cell multi-TRP environment with the non-CA framework.

```
CSI-RS-CellMobility ::=        SEQUENCE {
    cellId                     PhysCellId,
    csi-rs-MeasurementBW       SEQUENCE {
    nrofPRBs                   ENUMERATED { size24, size48,
size96, size 192, size264},
    startPRB                   INTEGER(0..2169)
    },
    density                    ENUMERATED {d1,d3}
OPTIONAL, -- Need R
    csi-rs-ResourceList-Mobility   SEQUENCE (SIZE
(1..maxNrofCSI-RS-ResourcesRRM)) OF CSI-RS-Resource-Mobility
    }
CSI-RS-Resource-Mobility ::=   SEQUENCE {
    csi-RS-Index               CSI-RS-Index,
    slotConfig                 CHOICE {
    ms4                        INTEGER (0..31),
    ms5                        INTEGER (0..39),
    ms10                       INTEGER (0..79),
    ms20                       INTEGER (0..159),
    ms40                       INTEGER (0..319)
    },
    associatedSSB              SEQUENCE {
    ssb-Index                  SSB-Index,
    isQuasiColocated           BOOLEAN
    }
OPTIONAL, -- Need R
    frequencyDomainAllocation  CHOICE {
    row1                       BIT STRING (SIZE (4)),
    row2                       BIT STRING (SIZE (12))
    },
    firstOFDMSymbolInTimeDomain  INTEGER (0..13),
    sequenceGenerationConfig   INTEGER (0..1023),
    ...
```

-continued

```
}
CSI-RS-Index ::=        INTEGER (0..maxNrofCSI-RS-
ResourcesRRM-1)
```

In this embodiment, when adding the CSI-RS for mobility 16-15 as a new QCL reference antenna port, some constraints may be considered.

For example, when the CSI-RS for mobility 16-15 is applied as a new QCL reference antenna port, it may be guaranteed to always configure the density of the CSI-RS for mobility to a high value (i.e., always configure density=d3 in the CSI-RS-CellMobility configuration) in view of the accuracy of QCL application.

In another example, when the CSI-RS for mobility 16-15 is applied as a new QCL reference antenna port, it is possible to guarantee to designate only reception beam information of the UE by limiting the type of the QCL configuration to QCL-type D. In this case, QCL-types A to C may be referred to in the current serving cell of the UE.

In still another example, when the CSI-RS for mobility 16-15 is applied as a new QCL reference antenna port, it is possible to guarantee to apply an SSB 16-20 associated with the CSI-RS-Resource-Mobility (i.e., an SSB indicated by associatedSSB in the CSI-RS-Resource-Mobility) as a QCL reference antenna port, rather than directly using the CSI-RS for mobility 16-15. Here, by configuring isQuasiColocated in the associatedSSB, it may be guaranteed to apply this example only when the CSI-RS for mobility and the associated SSB are mutually subjected to QCL.

Third Embodiment: Method of Satisfying Condition for Using TRS not Configured as QCL Reference Antenna Port A third embodiment relates to a method for performing a suitable operation according to a situation in which it is not necessary to refer to a PCI value of an adjacent TRP, that is, separately according to a situation in which it is required to configure an additional QCL reference antenna port other than a serving cell-based QCL reference antenna port and a situation in which it is not required to configure the additional QCL reference antenna port.

Figure 17:
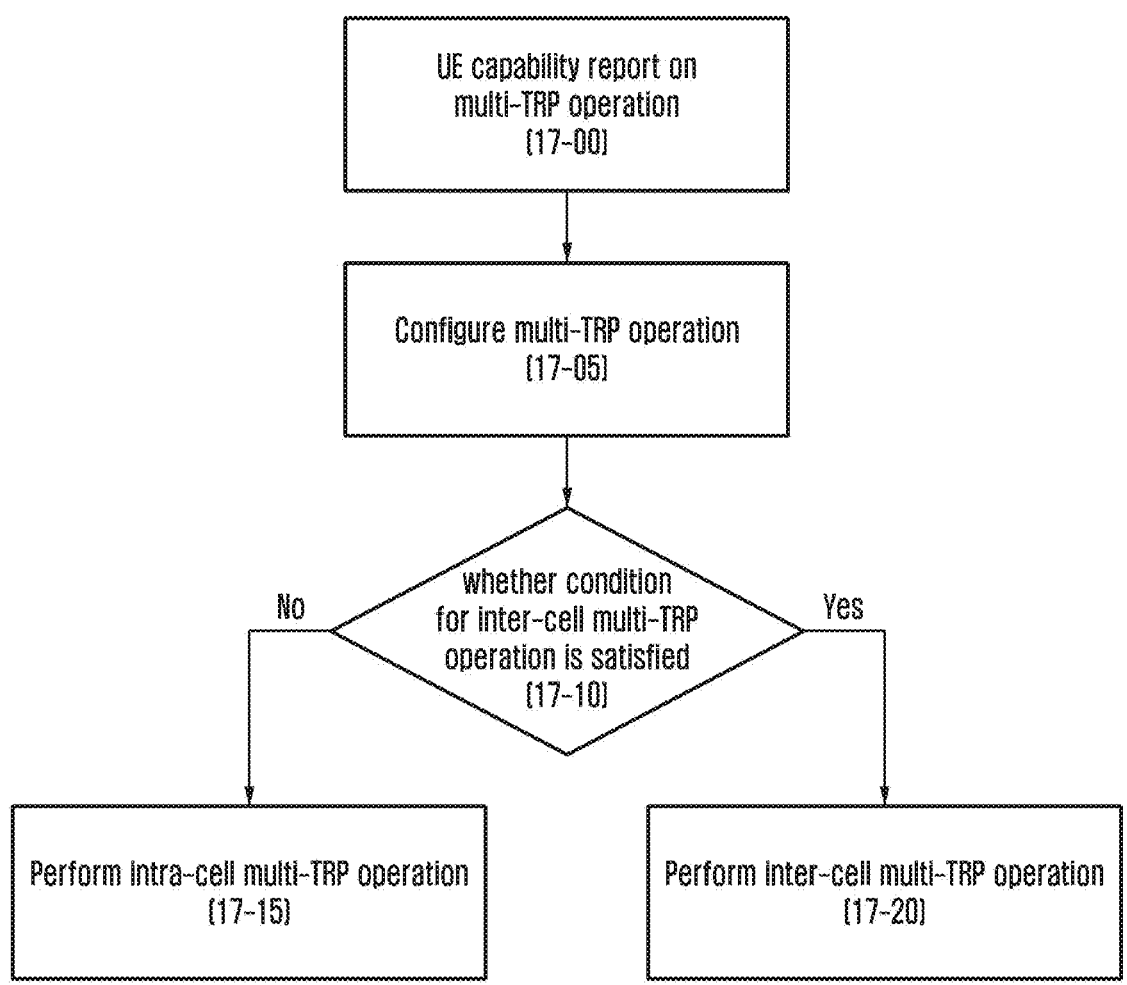
FIG. 17 illustrates an intra-cell multi-TRP operation and an inter-cell multi-TRP operation according to an embodiment of the disclosure.

FIG. 17 illustrates an intra-cell multi-TRP operation and an inter-cell multi-TRP operation according to an embodiment.

Referring to FIG. 17, a UE may perform a UE capability report on a multi-TRP operation (17-00). The UE capability report on the multi-TRP operation may report whether an intra-cell multi-TRP operation is possible and whether an inter-cell multi-TRP operation is possible together (i.e., report that both operations are possible or impossible), or may individually report whether the two operations are possible. Subsequently, a base station may configure a multi-TRP operation for a UE capable of the multi-TRP operation (17-05). The UE may determine whether the inter-cell multi-TRP operation is possible according to a pre-agreed rule, that is, whether TRS reception is possible without configuring a QCL reference antenna port (17-10). For example, in the pre-agreed rule, as a deriveSSB-Index-FromCell parameter is configured to true, the base station aligns a subframe number (SFN) and a frame boundary for each cell. When the inter-cell multi-TRP operation is impossible, the UE may receive a configured QCL reference antenna port based on a serving cell PCI to perform the intra-cell multi-TRP operation (17-15). When the inter-cell multi-TRP operation is possible, the UE may perform the intra-cell multi-TRP operation without configuring a QCL reference antenna port (17-20).

In the above embodiments, it is assumed that the TRSs 15-00 and 16-00 are target antenna ports, but the disclosure is not limited thereto, and a method similar to that illustrated above may be applied to other types of target antenna ports.

Fourth Embodiment: Method of Adding PCI Value to SSB-Based Channel State Measurement Configuration This embodiment provides a method of using an RS transmitted in a cell for a PCI which a UE is not attached to/does not camp on or a TRP, for example, an SSB or a CSI-RS for mobility, as a reference signal for channel state measurement in an inter-cell multi-TRP situation with a non-CA framework.

First, a method for configuring a reference signal for L1-RSRP or L1-SINR measurement is provided. A conventional reference signal configuration for L1-RSRP or L1-SINR measurement is indicated from a base station to a UE through a CSI-ResourceConfig IE or a similar signaling structure as shown in the following table, and the type of a reference signal configurable for L1-RSRP or L1 SINR measurement may be an SSB, a CSI-RS, or a CSI-IM.

```
CSI-ResourceConfig ::=   SEQUENCE {
  csi-ResourceConfigId   CSI-ResourceConfigId,
  csi-RS-ResourceSetList   CHOICE {
  nzp-CSI-RS-SSB       SEQUENCE {
  nzp-CSI-RS-ResourceSetList SEQUENCE (SIZE
(1..maxNrofNZP-CSI-RS-ResourceSetsPerConfig)) OF NZP-CSI-RS-
ResourceSetId OPTIONAL, -- Need R
  csi-SSB-ResourceSetList   SEQUENCE (SIZE (1..maxNrofCSI-
SSB-ResourceSetsPerConfig)) OF CSI-SSB-ResourceSetId
OPTIONAL -- Need R
  },
  csi-IM-ResourceSetList   SEQUENCE (SIZE (1..maxNrofCSI-
IM-ResourceSetsPerConfig)) OF CSI-IM-ResourceSetId
  },
  bwp-Id         BWP-Id,
  resourceType       ENUMERATED { aperiodic, semiPersistent,
periodic },
  ...
}
```

When an SSB is configured in the CSI-ResourceConfig IE of the table, a list of SSB sets for measuring L1-RSRP or L1-SINR may be indicated in the csi-SSB-ResourceSetList element. Each of the SSB sets in the csi-SSB-ResourceSetList element may include an ID for the SSB set (csi-SSB-ResourceSetId) and a list of SSB indexes belonging to the SSB set (csi-SSB-ResourceList) as shown in the following table.

```
CSI-SSB-ResourceSet ::=     SEQUENCE {
  csi-SSB-ResourceSetId     CSI-SSB-ResourceSetId,
  csi-SSB-ResourceList      SEQUENCE (SIZE(1..maxNrofCSI-
SSB-ResourcePerSet)) OF SSB-Index,
  ...
}
```

The SSB indexes belonging to the conventional SSB set are limited to a PCell which the UE is attached to or camps on or a SCell configured for the UE. According to an embodiment of the disclosure, to use an SSB of a cell for a PCI, which is a PCell that the UE is not attached to or does not camp on or which is not configured as a SCell, or a TRP for L1-RSRP or L1-SINR measurement, the base station may indicate not only an SSB index but also a PCI corresponding to the SSB index to the UE. In indicating a PCI, an individual PCI may be indicated for each SSB index in the SSB set, one PCI may be indicated for each SSB set, or one PCI may be indicated for each CSI-ResourceConfig. For example, when one PCI is indicated for each SSB set, a parameter indicating a PCI (physCellId) may be added to the SSB set configuration (csi-SSB-ResourceList) as follows.

```
CSI-SSB-ResourceSet ::=        SEQUENCE {
   csi-SSB-ResourceSetId       CSI-SSB-ResourceSetId,
   csi-SSB-ResourceList        SEQUENCE (SIZE(1..maxNrofCSI-
SSB-ResourcePerSet)) OF SSB-Index,
   physCellId                  PhysCellId
   ...
}
```

Next, a method of configuring a reference signal for beam failure recovery is provided. After periodically measuring a reference signal corresponding to a specific link, when the UE determines that the reception quality, for example, RSRP, of the reference signal is not good, the UE may declare a beam failure in the link and may perform a beam recovery procedure. The beam recovery procedure may start with the UE transmitting beam failure declaration information to the base station. The beam failure declaration information may include information about a link that needs restoring and information about a beam with which the link is restored. The information about the link that needs restoring may include an index of a serving cell for the link and/or information about a reference signal periodically measured in the serving cell. The 'periodically measured reference signal' may be referred to as a beam failure detection (BFD) reference signal. The information about the beam with which the link is restored may include an index for a new reference signal with a good reception quality selected by the UE. The 'new reference signal with the good reception quality' may be referred to as a candidate beam detection (CBD) reference signal.

In a conventional beam recovery procedure, an SSB and a CSI-RS may be used as a BFD RS and a CBD RS, and the conventionally available SSB is limited to an SSB belonging to a PCell which the UE is attached to or camps on or a SCell configured for the UE. Therefore, according to an embodiment of the disclosure, to use an SSB of a cell for a PCI, which is a PCell that the UE is not attached to or does not camp on or which is not configured as a SCell, or a TRP, when the SSB is indicated as a BFD RS and/or a CBD RS, a PCI to which the SSB belongs may also be indicated. For example, when using an SSB as a BFD RS and/or a CBD RS for a beam recovery procedure for a PCell, a parameter indicating PCI (physCellId) may be indicated together with an SSB index as shown in the following table.

```
BFR-SSB-Resource ::=    SEQUENCE {
   ssb                  SSB-Index,
   ra-PreambleIndex     INTEGER (0..63),
   physCellId           PhysCellId,
   ...
}
```

The default value of the PCI parameter configured in the foregoing embodiments may be configured. For example, when physCellId is not indicated, the default value of physCellId may be a PCI for a PCell which the UE is attached to or camps on or a configured SCell.

Next, in the foregoing embodiments, whether a PCI parameter can be configured in an SSB may be determined according to a UE capability report, which may be similar to that described in FIG. 17. The UE capability report on the multi-TRP operation may report whether an intra-cell multi-TRP operation is possible and whether an inter-cell multi-TRP operation is possible together (i.e., report that both operations are possible or impossible), or may individually report whether the two operations are possible. Subsequently, a base station may configure a multi-TRP operation for a UE capable of the multi-TRP operation. The configuration of the multi-TRP operation refers to a configuration for measuring an SSB transmitted to an inter-cell multi-TRP for L1-RSRP/L1-SINR measurement or a BFD/CBD procedure. In configuring this operation, a pre-agreed constraint may be additionally configured. The pre-agreed constraint may be, for example, a condition in which a deriveSSB-IndexFromCell parameter is configured to true, and thus the base station aligns a subframe number (SFN) and a frame boundary for each cell. When the inter-cell multi-TRP operation is impossible, the base station may configure the multi-TRP operation not to be performed, that is, only an SSB of a serving cell to be used when using an SSB for L1-RSRP/L1-SINR measurement or a BFD/CBD procedure. According to the foregoing configuration, the UE may perform an inter-cell multi-TRP operation or only a single-cell operation.

According to an embodiment of the disclosure in accordance with the above description, in a wireless communication system, a base station may transmit at least one MAC control element (MAC CE) and downlink control information (DCI) for allocating a plurality of physical downlink shared channels (PDSCHs) to a plurality of UEs in order to support joint transmission (JT).

A method for a UE to perform communication in a wireless communication system according to an embodiment of the disclosure may include: an operation of transmitting capability information about the UE including information about whether to support cooperative communication to a base station; an operation of obtaining information about whether the cooperative communication is activated from the base station through radio resource control (RRC) as the UE supports the cooperative communication; an operation of identifying the format of a MAC control element (CE) received from the base station, based on whether the base station activates the cooperative communication; an operation of determining a transmission configuration indication (TCI) state per transmission reception point (TRP), based on the identified format of the MAC CE; and an operation of receiving a PDSCH transmitted from one or more TRPs by referring to the determined one or more TCI states.

A method for a UE to perform communication in a wireless communication system according to an embodiment of the disclosure may include: an operation of transmitting capability information about the UE including information about whether to support cooperative communication to a base station; an operation of obtaining information about whether the cooperative communication is activated from the base station through radio resource control (RRC) as the UE supports the cooperative communication; an operation of detecting downlink control information (DCI) transmitted from the base station, based on whether the base station activates the cooperative communication; and an operation of receiving a PDSCH allocated by each piece of DCI by referring to a transmission configuration indication (TCI) state indicated by each piece of DCI when two or more pieces of DCI among the detected DCI perform PDSCH allocation to a specific time/frequency resource.

In the method for the UE to perform the communication in the wireless communication system according to an embodiment of the disclosure, the operation of determining the TCI state may include an operation in which the base station identifies information about one or more TCI states activated from one or more MAC CEs as the cooperative communication is activated.

In the method for the UE to perform the communication in the wireless communication system according to an embodiment of the disclosure, the operation of determining the TCI state may include an operation in which the base station identifies information about one or more TCI states indicated from one or more pieces of DCI as the cooperative communication is activated.

In the method for the UE to perform the communication in the wireless communication system according to an embodiment of the disclosure, the operation of determining the TCI state may include an operation in which the base station refers to a first physical cell identity (PCI) for one quasi co-location (QCL) information and refers to a second PCI for another QCL information in referring to QCL information according to the one or more TCI states indicated from the one or more pieces of DCI as the cooperative communication is activated.

The method for the UE to perform the communication in the wireless communication system according to an embodiment of the disclosure may further include an operation of updating the direction of a beam for a PDCCH or the PDSCH, based on an activated TCI state pair per TRP included in the MAC CE.

The method for the UE to perform the communication in the wireless communication system according to an embodiment of the disclosure may further include: an operation of receiving downlink control information (DCI); and an operation of determining a DMRS port for the cooperative communication from a preset field in the received DCI when it is determined that the base station activates the cooperative communication.

The method for the UE to perform the communication in the wireless communication system according to an embodiment of the disclosure may further include: an operation of identifying a field including information about the DMRS port for the cooperative communication from the preset field in the DCI received from the base station when it is determined that the base station activates the cooperative communication; and an operation of determining the DMRS port for the cooperative communication, based on a value included in the identified field.

A method for a base station to perform communication in a wireless communication system according to an embodiment may include: an operation of receiving capability information about a UE including information about whether to support cooperative communication; an operation of transmitting information about whether the cooperative communication is activated to the UE through RRC as the UE supports the cooperative communication; and an operation of transmitting a MAC control element (CE) including information about a transmission configuration indication (TCI) state for a plurality of transmission reception point (TRPs).

Figure 18:
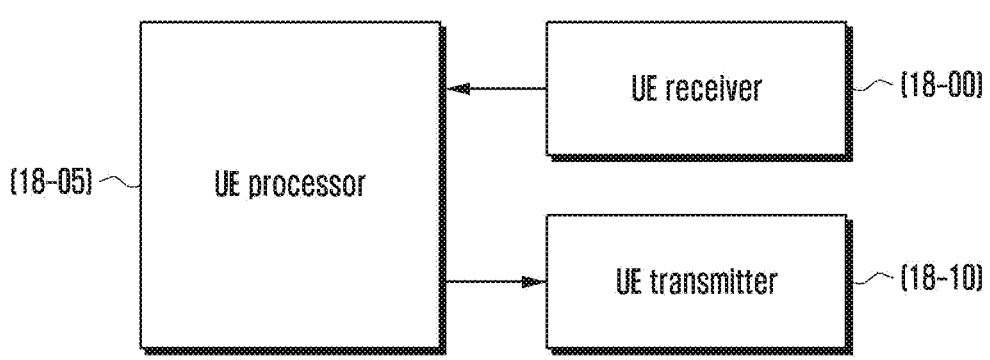
FIG. 18 is a block diagram illustrating the structure of a UE according to an embodiment of the disclosure.

FIG. 18 is a block diagram illustrating the structure of a UE according to some embodiments.

Referring to FIG. 18, the UE may include a UE receiver 18-00, a UE transmitter 18-10, and a UE processor 18-05. The UE receiver 18-00 and the UE transmitter 18-10 may be collectively referred to as a transceiver. The UE receiver 18-00, the UE transmitter 18-10, and the UE processor 18-05 of the UE may operate according to the foregoing communication method of the UE. However, components of the UE are not limited to the aforementioned examples. For example, the UE may include more components (e.g., a memory) or fewer components than the aforementioned components. In addition, the UE receiver 18-00, the UE transmitter 18-10, and the UE processor 18-05 may be configured as a single chip.

The UE receiver 18-00 and the UE transmitter 18-10 (or the transceiver) may transmit and receive a signal to and from a base station. Here, the signal may include control information and data. To this end, the transceiver may include an RF transmitter to upconvert and amplify the frequency of a transmitted signal and an RF receiver to perform low-noise amplification of a received signal and to downconvert the frequency of the received signal. However, this is only an embodiment of the transceiver, and components of the transceiver are not limited to the RF transmitter and the RF receiver.

In addition, the transceiver may receive a signal through a radio channel to output the signal to the UE processor 18-05 and may transmit a signal output from the UE processor 18-05 through the radio channel The memory (not shown) may store a program and data necessary for the operation of the UE. Further, the memory may store control information or data included in a signal obtained by the UE. The memory may be configured as a storage medium, such as a ROM, a RAM, a hard disk, a CD-ROM, and a DVD, or a combination of storage media.

The UE processor 18-05 may control a series of processes such that the UE may operate according to the foregoing embodiments of the disclosure. The UE processor 18-05 may be configured as a controller or one or more processors.

Figure 19:
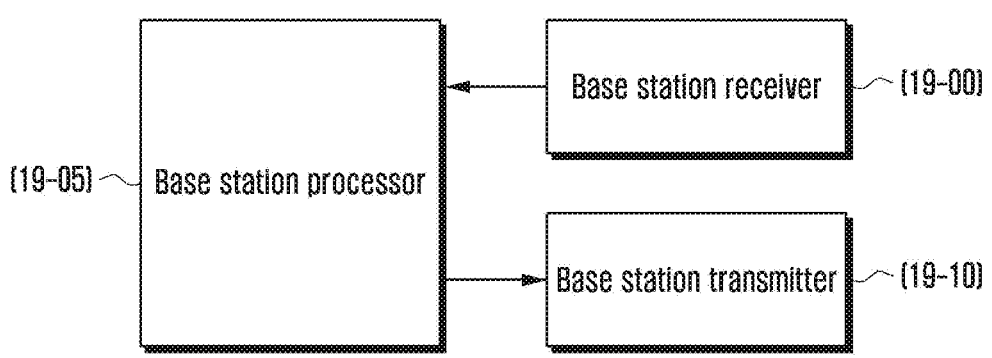
FIG. 19 is a block diagram illustrating the structure of a base station according to an embodiment of the disclosure.

FIG. 19 is a block diagram illustrating the structure of a base station according to some embodiments.

Referring to FIG. 19, the base station may include a base station receiver 19-00, a base station transmitter 19-10, and a base station processor 19-05. The base station receiver 19-00 and the base station transmitter 19-10 may be collectively referred to as a transceiver. The base station receiver 19-00, the base station transmitter 19-10, and the base station processor 19-05 of the base station may operate according to the foregoing communication method of the base station. However, components of the base station are not limited to the aforementioned examples. For example, the base station may include more components (e.g., a memory) or fewer components than the aforementioned components. In addition, the base station receiver 19-00, the base station transmitter 19-10, and the base station processor 19-05 may be configured as a single chip.

The base station receiver 19-00 and the base station transmitter 19-10 (or the transceiver) may transmit and receive a signal to and from a UE. Here, the signal may include control information and data. To this end, the transceiver may include an RF transmitter to upconvert and amplify the frequency of a transmitted signal and an RF receiver to perform low-noise amplification of a received signal and to downconvert the frequency of the received signal. However, this is only an embodiment of the transceiver, and components of the transceiver are not limited to the RF transmitter and the RF receiver.

In addition, the transceiver may receive a signal through a radio channel to output the signal to the base station processor 19-05 and may transmit a signal output from the base station processor 19-05 through the radio channel The memory (not shown) may store a program and data necessary for the operation of the base station. Further, the memory may store control information or data included in a signal obtained by the base station. The memory may be configured as a storage medium, such as a ROM, a RAM, a hard disk, a CD-ROM, and a DVD, or a combination of storage media.

The base station processor 19-05 may control a series of processes such that the base station may operate according to the foregoing embodiments. The base station processor 19-05 may be configured as a controller or one or more processors.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the embodiments may be implemented. Further, the above respective embodiments may be employed in combination, as necessary. For example, embodiments 1 to 4 of the disclosure may be entirely or partially combined to operate a base station and a terminal.

The invention claimed is:

1. A method performed by a user equipment (UE) in a communication system, the method comprising:
   receiving, from a base station, information for a synchronization signal and physical broadcast channel (SS/PBCH) block (SSB) resource set, wherein the information includes SSB indices associated with the SSB resource set;
   receiving, from the base station, an SSB;
   identifying layer-1 reference signal received power (L1-RSRP) associated with the SSB; and
   transmitting, to the base station, channel state information (CSI) related to the L1-RSRP associated with the SSB,
   wherein the information includes physical cell identities (PCIs) of SSBs associated with the SSB resource set, and
   wherein each PCI is associated with corresponding SSB index among the SSB indices associated with the SSB resource set.

2. The method of claim 1, wherein the PCIs of the SSBs associated with the SSB resource set comprise at least one PCI different from a PCI of a serving cell.

3. The method of claim 1, further comprising:
   receiving, from the base station, information for a transmission configuration indicator (TCI) state associated with a PCI different from a PCI of a serving cell.

4. The method of claim 3, wherein the information for the TCI state indicates an SSB associated with the PCI different from the PCI of the serving cell as a QCL reference signal.

5. A method performed by a base station in a communication system, the method comprising:
   transmitting, to a user equipment (UE), information for a synchronization signal and physical broadcast channel (SS/PBCH) block (SSB) resource set, wherein the information includes SSB indices associated with the SSB resource set;
   transmitting, to the UE, an SSB; and
   receiving, from the UE, channel state information (CSI) related to layer-1 reference signal received power (L1-RSRP) associated with the SSB,
   wherein the information includes physical cell identities (PCIs) of SSBs associated with the SSB resource set, and
   wherein each PCI is associated with corresponding SSB index among the SSB indices associated with the SSB resource set.

6. The method of claim 5, wherein the PCIs of the SSBs associated with the SSB resource set comprise at least one PCI different from a PCI of a serving cell.

7. The method of claim 5, further comprising:
   transmitting, to the UE, information for a transmission configuration indicator (TCI) state associated with a PCI different from a PCI of a serving cell.

8. The method of claim 7, wherein the information for the TCI state indicates an SSB associated with the PCI different from the PCI of the serving cell as a QCL reference signal.

9. A user equipment (UE) in a communication system, the UE comprising:
   a transceiver; and
   a controller configured to:
      receive, from a base station, information for a synchronization signal and physical broadcast channel (SS/PBCH) block (SSB) resource set, wherein the information includes SSB indices associated with the SSB resource set,
      receive, from the base station, an SSB,
      identify layer-1 reference signal received power (L1-RSRP) associated with the SSB, and
      transmit, to the base station, channel state information (CSI) related to the L1-RSRP associated with the SSB,
   wherein the information includes physical cell identities (PCIs) of SSBs associated with the SSB resource set, and
   wherein each PCI is associated with corresponding SSB index among the SSB indices associated with the SSB resource set.

10. The UE of claim 9, wherein the PCIs of the SSBs associated with the SSB resource set comprise at least one PCI different from a PCI of a serving cell.

11. The UE of claim 9, wherein the controller is further configured to receive, from the base station, information for a transmission configuration indicator (TCI) state associated with a PCI different from a PCI of a serving cell.

12. The UE of claim 11, wherein the information for the TCI state indicates an SSB associated with the PCI different from the PCI of the serving cell as a QCL reference signal.

13. A base station in a communication system, the base station comprising:
   a transceiver; and
   a controller configured to:
      transmit, to a user equipment (UE), information for a synchronization signal and physical broadcast channel (SS/PBCH) block (SSB) resource set, wherein the information includes SSB indices associated with the SSB resource set,
      transmit, to the UE, an SSB, and
      receive, from the UE, channel state information (CSI) related to layer-1 reference signal received power (L1-RSRP) associated with the SSB,
   wherein the information includes physical cell identities (PCIs) of SSBs associated with the SSB resource set, and wherein each PCI is associated with corresponding SSB index among the SSB indices associated with the SSB resource set.

14. The base station of claim 13, wherein the PCIs of the SSBs associated with the SSB resource set comprise at least one PCI different from a PCI of a serving cell.

15. The base station of claim 13,
wherein the controller is further configured to transmit, to the UE, information for a transmission configuration indicator (TCI) state associated with a PCI different from a PCI of a serving cell, and
wherein the information for the TCI state indicates an SSB associated with the PCI different from the PCI of the serving cell as a QCL reference signal.

* * * * *